US011829320B2

(12) United States Patent
Dobbs et al.

(10) Patent No.: US 11,829,320 B2
(45) Date of Patent: *Nov. 28, 2023

(54) MEMORY NETWORK PROCESSOR

(71) Applicant: Coherent Logix, Incorporated, Austin, TX (US)

(72) Inventors: Carl S. Dobbs, Austin, TX (US); Keith M. Bindloss, San Clemente, CA (US); Kenneth R. Faulkner, Austin, TX (US); Alex E. Icaza, Austin, TX (US); Frederick A. Rush, Hillsdale, MI (US); Faisal A. Syed, Austin, TX (US); Michael R. Trocino, Austin, TX (US)

(73) Assignee: Coherent Logix, Incorporated, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,871

(22) Filed: Oct. 20, 2022

(65) Prior Publication Data

US 2023/0061478 A1 Mar. 2, 2023

Related U.S. Application Data

(63) Continuation of application No. 16/931,864, filed on Jul. 17, 2020, now Pat. No. 11,550,750, which is a
(Continued)

(51) Int. Cl.
*G06F 15/173* (2006.01)
*G06F 9/54* (2006.01)
*H04L 45/745* (2022.01)

(52) U.S. Cl.
CPC ........ *G06F 15/17343* (2013.01); *G06F 9/542* (2013.01); *G06F 9/544* (2013.01);
(Continued)

(58) Field of Classification Search
CPC .... G06F 15/17343; G06F 9/542; G06F 9/544; G06F 9/546; G06F 15/17312; H04L 45/745; Y02D 10/00
See application file for complete search history.

(56) References Cited

U.S. PATENT DOCUMENTS 4,323,981 A * 4/1982 Nakamura .......... G06F 15/7896
708/670
5,459,836 A 10/1995 Whittaker et al.
(Continued)

FOREIGN PATENT DOCUMENTS

| JP | 2006277635 A | 10/2006 |
|---|---|---|
| JP | 2012146201 A | 8/2012 |
| WO | 2013098993 A1 | 7/2013 |

OTHER PUBLICATIONS

International Search Report and Written Opinion for International Application No. PCT/US2018/058873 (5860-05602) dated Feb. 18, 2019, 14 pages.

*Primary Examiner* — Farley Abad
(74) *Attorney, Agent, or Firm* — Kowert, Hood, Munyon, Rankin & Goetzel, P.C.

(57) ABSTRACT

A multi-processor system with processing elements, interspersed memory, and primary and secondary interconnection networks optimized for high performance and low power dissipation is disclosed. In the secondary network multiple message routing nodes are arranged in an interspersed fashion with multiple processors. A given message routing node may receive messages from other message nodes, and relay the received messages to destination message routing nodes using relative offsets included in the messages. The relative offset may specify a number of message nodes from the message node that originated a message to a destination message node.

16 Claims, 22 Drawing Sheets

Related U.S. Application Data continuation of application No. 16/178,738, filed on Nov. 2, 2018, now Pat. No. 10,747,709.

(60) Provisional application No. 62/581,512, filed on Nov. 3, 2017.

(52) U.S. Cl.
CPC ........ G06F 9/546 (2013.01); G06F 15/17312 (2013.01); H04L 45/745 (2013.01)

(56) References Cited

U.S. PATENT DOCUMENTS

| | | | |
|---|---|---|---|
| 5,509,012 | A | 4/1996 | Chung et al. |
| 6,336,145 | B2 | 1/2002 | Kim |
| 7,505,734 | B2 | 3/2009 | Ratiu et al. |
| 9,043,478 | B2 | 5/2015 | Burns et al. |
| 9,760,526 | B1 | 9/2017 | Shubel |
| 2002/0199090 | A1* | 12/2002 | Wilson ................ G06F 9/30072 712/E9.05 |
| 2004/0001445 | A1* | 1/2004 | Stansfield ............. G06F 9/3885 370/254 |
| 2004/0030860 | A1* | 2/2004 | Wang .................... G06F 9/3885 712/E9.05 |
| 2005/0285862 | A1* | 12/2005 | Noda ................... G11C 7/1006 345/530 |
| 2008/0046645 | A1 | 2/2008 | Chang et al. |
| 2008/0222389 | A1 | 9/2008 | Bruce et al. |
| 2009/0006808 | A1 | 1/2009 | Blumrich et al. |
| 2014/0025884 | A1 | 1/2014 | Stark et al. |
| 2014/0143470 | A1 | 5/2014 | Dobbs et al. |
| 2014/0143520 | A1* | 5/2014 | Dobbs .................... G06F 9/546 712/30 |
| 2014/0317388 | A1* | 10/2014 | Chung ................ G06F 9/30189 712/229 |
| 2016/0328231 | A1 | 11/2016 | Doerr et al. |
| 2017/0134042 | A1 | 5/2017 | Wang et al. |
| 2017/0286196 | A1 | 10/2017 | Dobbs et al. |

* cited by examiner

| DP | | AGU | |
|---|---|---|---|
| Pcond | Syntax | GPcond | Syntax |
| Pn=1 | (Pn) | GP0=1 | (GP0) |
| Pm=1 | (Pm) | GP1=1 | (GP1) |
| Pn=0 AND Pm=0 | (!Pn & !Pm) | GP0=0 AND GP1=0 | (!GP0 & !GP1) |
| Pn=1 AND Pm=0 | (Pn & !Pm) | GP0=1 AND GP1=0 | (GP0 & !GP1) |
| Pn=0 AND Pm=1 | (!Pn & Pm) | GP0=0 AND GP1=1 | (!GP0 & GP1) |
| Pn=1 AND Pm=1 | (Pn & Pm) | GP0=1 AND GP1=1 | (GP0 & GP1) |
| Pn XOR Pm | (Pn ^ Pm) | GP0 XOR GP1 | (GP0 ^ GP1) |
| Pn XNOR Pm | !(Pn ^ Pm) | GP0 XNOR GP1 | !(GP0 ^ GP1) |
| Pn=1 OR Pm=1 | (Pn \| Pm) | GP0=1 OR GP1=1 | (GP0 \| GP1) |
| UNCOND | | | |
| SIMD control of DP 16b segments | (Pn Pm) | | | n = 0 or 2 m = 1 or 3

FIG. 6

DP Conditional Instructions

| Conditional Operation | Description | Instruction Syntax |
|---|---|---|
| Conditional Move | if (cond) dstD = srcA | CMOV (cond) srcA, dstD<br>or<br>if (cond) CMOV srcA, dstD<br>cond: GP0-GP1, P0-P1 |
| Conditional Select | if (cond) dstD = srcA,<br>else dstD = srcB | CMOV (cond) srcA, srcB, dstD<br>or<br>if (cond) CMOV srcA, srcB, dstD<br>cond: GP0-GP1, P0-P1 |

AGU Conditional Instructions

| Conditional Operation | Description | Instruction Syntax |
|---|---|---|
| Conditional Move | if (cond) dstD = srcA | CMOV (cond) srcA, dstD<br>or<br>if (cond) CMOV srcA, dstD<br>cond: GP0-GP1 |
| Conditional Select | if (cond) dstD = srcA,<br>else dstD = srcB | CMOV (cond) srcA, srcB, dstD<br>or<br>if (cond) CMOV srcA, srcB, dstD<br>cond: GP0-GP1 |

Program Flow Instructions

| Conditional Operation | Description | Instruction Syntax |
|---|---|---|
| Conditional Jump | if (cond) jump to <addr>, else continue | JMP (cond) <addr><br>or<br>if (cond) JMP <addr><br>cond: GP0-GP1, P0-P3 |
| Conditional Jump to Subroutine | if (cond) jump to subroutine at <addr>, else continue | JSR (Pcond) <addr><br>or<br>if (Pcond) JSR <addr><br>cond: GP0-GP1, P0-P1 |

FIG. 7

| Conditional Operation | Description | Instruction Syntax |
|---|---|---|
| Start If | Check for a CMP condition on srcA and srcB.<br><br>If condition is true, start executing the following instructions until ELSE or ENDIF is encountered.<br><br>If condition is false, no-op the following instructions until ELSE or ENDIF is encountered. | STARTIF tcond srcA, srcB |
| Else | If condition is false, start executing the following instructions until ENDIF is encountered.<br><br>If condition is true, no-op the following instructions until ENDIF is encountered. | ELSE |
| End If | End conditional execution of current block. | ENDIF |

*FIG. 8*

Notes

- Top-level view of logic for one datapath (DP)
- Each box contains an adder with additional logic
- 16-bit quantities are signed
- 4-bit LUT outputs unsigned
- At most 4 LUTs active in one cycle
- All math saturates from users perspective

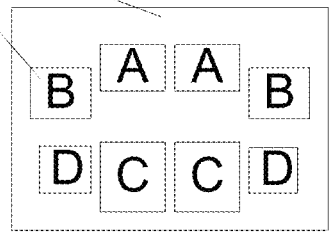

Adders

Pair A
  - 2-input 16-bit add/sub
  - Executes in stage 1
  - Possibly maps to existing stage 1 adders Pair B
  - 2-input 16-bit add
  - Executes in stage 1 or stage 2
  - Likely maps to requested new adders Pair C
  - 3-input 16-bit add/sub
  - Executes in stage 2
  - Likely maps to existing "big" 3-input adders Pair D
  - 2-input 16+4bit add
  - Executes in stage 2 or stage 3
  - Possibly maps to existing stage 3 adders

Additional Diagram Notes

Active mux governed by sign bit during execution

Active mux selected or overridden by instruction encoding. Values governed by instruction encoding appear in red.

Hardware whose output is unused is greyed-out. Inactive LUTs and adders output zero.

*FIG. 9*

| Type of Information | Msg Type | Description | A or B register used | Bits |
|---|---|---|---|---|
| Format | P2P,Multi,SEC | Message format | MSG_CONF | 3 |
| Config | P2P,Multi,SEC | Reply and route options. | MSG_CONF | 2 |
| Read/Write | P2P,Multi | Read or write message. | MSG_CONF | 1 |
| Reply_single | P2P,Multi,SEC | Determine reply type. | MSG_CONF | 1 |
| Remote Start Address | P2P,Multi | Start address for remote node. | ADDR | 15 |
| Remote End Address | P2P,Multi | End Address for remote node. | ADDR_END | 15 |
| Local Start Address | P2P,Multi,SEC | Start address for storing reply locally. | LOCAL_ADDR | 16 |
| Local End Address | P2P,Multi,SEC | End address for storing reply locally. | LOCAL_ADDR_END | 16 |
| Route Information | P2P,SEC | X and Y offsets for the destination. | DELTA_OFFSET | 16 |
| Multi_Node info | Multi | Used by Multicast messages to indicate recievers. | DELTA_OFFSET (1-hot like MULTICAST_EN) | 16 |
| Send Message | P2P,Multi,SEC | Writing a 1 to GEN_MSG field sends the message. | CONTROL | 1 |

*FIG. 16*

MEMORY NETWORK PROCESSOR

PRIORITY INFORMATION

This application is a continuation of U.S. patent application Ser. No. 16/931,864, entitled "Memory Network Processor" filed on Jul. 17, 2020, which is a continuation of U.S. application Ser. No. 16/178,738, entitled "Memory Network Processor" filed on Nov. 2, 2018, which claims benefit of priority to U.S. Application No. 62/581,512 entitled "Memory Network Processor", filed on Nov. 3, 2017, by Carl S. Dobbs, et al., the contents of each of these applications being hereby incorporated by reference in its entirety.

INCORPORATION BY REFERENCE

U.S. Pat. No. 9,430,369 titled "Memory-Network Processor with Programmable Optimizations" whose inventors are Michael B. Doerr, Carl S. Dobbs, Michael B. Solka, Michael R. Trocino, Kenneth R. Faulkner, Keith M. Bindloss, Sumeer Arya, John Mark Beardslee, and David A. Gibson, is hereby incorporated by reference in its entirety as though fully and completely set forth herein.

U.S. Pat. No. 9,424,441 titled "Multiprocessor fabric having configurable communication that is selectively disabled for secure processing" whose inventors are Michael B. Doerr, Carl S. Dobbs, Michael B. Solka, Michael R. Trocino, and David A. Gibson, is hereby incorporated by reference in its entirety as though fully and completely set forth herein.

TECHNICAL FIELD

This invention relates to multi-processor systems, and more particularly to improvements in processor operation and execution.

DESCRIPTION OF THE RELATED ART

A primary objective of a generic hardware system is to achieve application specific (non-programmable) hardware performance while preserving full programmability. Historically, these two concepts are diametric extremes. Application specific hardware is a fixed hardware solution that performs specific functions in the most efficient way possible. This is usually measured in terms of energy per function or energy per operation(s) and in terms of function per (circuit) area which can be related to partial cost of a product. Cost of a chip product is made up of many factors including die area and final package. Cost should also take into consideration the entire ecosystem to develop a product. This ecosystem cost is made up of the time to reduce a specific application to a specific hardware solution, the number of specific hardware solutions required to make up an entire system, and the time it takes to integrate all of the specific hardware solutions through customized communication and memory structures, etc. Thus a fully integrated solution is required to support all of the numerous specific hardware solutions with their custom interconnect, resulting in a very large area requirement on a single chip die. Historically, this process has resulted in solutions that are non-efficient in area, energy, and time-to-market.

When considering the world of programmability and the concept of targeting hardware, the marketplace or landscape from a hardware architectural and software development style perspective is represented by General Purpose Processors (GPPs) provided by Intel, AMD and ARM; Graphical Processing Units (GPUs) from NVIDIA and AMD; Digital Signal Processors (DSPs) from Texas Instruments and Analog Devices; Field Programmable Gate Arrays (FPGAs) from Xilinx, Altera, etc.; Multi-Core/Many-Core Processors from Cavium and Tilera; and Application Specific Integrated Circuits (ASICs) or System On Chips (SoCs).

GPPs are for general purpose processing, that is, trying to be a jack of all trades, based on old but proven hardware architecture thinking over more than 40 years. Their mainstream purpose is running user interface (UI) and highly interactive UI intensive applications like MSWord, Excel, email, etc., with a supporting operating system (e.g. Windows and Linux). The hardware characteristics that impact power dissipation are multi-level caches, complex hardware memory management units, large buses, and large clocking structures. In summary, they dissipate a lot of power to perform these tasks. From the perspective of software development, it is considered the easiest software programming model to target. This is from the perspective that the user is developing a single thread that executes consecutively or serially. When parallelism or multiple hardware threads (greater than about four threads) are introduced, the ability to program them efficiently becomes much harder. This is due to the fact that fundamentally the architecture was not developed to support parallel thread operation, and as a result the hardware architecture requires a tremendous amount of overhead complexity to manage. The software programming model requires the introduction of an API or language extensions in order to support the definition of multiple software threads. Although this does not have to be complex, unfortunately current GPP hardware architectures require such complexity.

At a high level, an API that has been extensively used with C, C++, Fortran, etc. for many years in every supercomputer in the world is the MPI (message passing interface) API, an industry standard since the early 1990s. This is a very simple, well understood, API that does not restrict the hardware implementation. The MPI API allows definition of software threads and communication in a manner that is independent of hardware. This is different from OpenMP, Coarray Fortran, OpenCL, etc. and other language/APIs that inherently dictate an assumed underlying hardware model, which thus restricts interpretation flexibility and causes a forward compatibility issue. In other words, with these latter languages/APIs, the programmer is required to rewrite the program for every new hardware platform targeted.

GPUs were historically developed for processing and targeting the display of data. They are hardware architecturally constrained by their out of core (external) memory model requirements and inner core memory model requirements. The out of core memory requires a GPP to place data in the GPUs memory space. The GPU then pulls in the data, operates on it in a pipeline fashion and then places it back in its external memory space. From here, the data can be sent to a display, or a GPP needs to move the data out of the GPUs memory space to be used/stored further in operation under general processing. Inefficiencies in the hardware are due to (1) the support required to move data around to support out-of-core hardware restrictions and (2) the limited inner-core memory structure, where data is restricted to being processed in streamlined pipelines—similar to deeply pipelined SIMD machines. The result is high power utilization due to hardware inefficiencies to process data. The software programming models used are extremely hardware centric, OpenCL, CUDA, etc. and thus are complex to achieve efficiency and not very portable, with code having to be re-written and re-structured when trying to move to a new hardware target platform.

DSPs can be viewed as a GPP with an instruction set that has been reduced and targeted for generic signal processing. They suffer from the same cache, MMU, and bus woes of their big brother/sister GPP. Additionally, any really high throughput processing function such as Viterbi/Turbo decoding or motion estimation has been reduced to an ASIC accelerator with limited capability, usually only supporting a limited set of specific standards in the commercial marketplace. The programming model is similar to the GPP when targeting a single hardware thread, but because of the signal processing instruction approach in execution unit hardware, to achieve any high efficiency requires hand assembly of functions or use of proprietary software libraries. When creating a multiple parallel DSP architecture, similar to the parallel GPP discussed above, the problems are further exacerbated.

FPGAs are a completely different hardware approach where the definition of functionality can be done at a bit-level and communication between logical functions is done through programmable wire structures. This hardware approach introduces tremendous overhead and complexity. Due to this, efficient programming is performed in a hardware programming language such as Verilog or VHDL. The compilation process is much more complex due to programmable wiring and programmable logic introducing timing closure hurdles, similar to what is required in an ASIC/SOC but with a structured wire fabric. Power dissipation and performance throughput on specific functions are obviously much better than a GPP or GPU when comparing only one function at a time due to the FPGA only performing exactly what it is programmed for and nothing else. However, if all of the capabilities of the GPP were attempted to be implemented in the FPGA, it would obviously be much worse than the GPP. The difficulty of programming at the hardware level is obvious (for example timing closure). Programming an FPGA really is not "programming," but rather it is logic/hardware design, and VHDL/Verilog are logic/hardware design languages, not programming languages.

Almost all of the multi-core/many-core architectures are, from a hardware perspective, taking a core processor, the cache, MMU, buses, and all associated logic and replicating them on a die with a communication bus/fabric around them. Examples of a multi-core architecture are IBM's Cell, Intel's and AMD's quad and N multi-cores, Cavium's and Tilera's products, a number of custom SoCs, etc. In addition, the power reduction achieved in multi-core architectures is largely insignificant. This result derives from the fact that the multi-core approach merely replicates the GPU approach. The only real power saving in a multi-core architecture is a reduction in some IO drivers which now are not needed since the cores are connected by an on-chip communication bus, whereas before they were on separate chips. Thus, the multi-core approach does not save much energy. Secondly, the software programming model is not improved from the GPP discussed above.

The list of issues identified for the other approaches is why, for specific markets, system developers commit to a custom chip that has specific GPPs, DSPs, and ASIC accelerators to form a system on a chip (SoC). A SoC provides programmability where needed and ASIC performance for specific functions to balance power dissipation and cost. However, now the software programming model is even more complex than discussed under the above programmable hardware solutions. In addition, SoCs may result in a loss of flexibility associated with a fully programmable solution.

Common among all of these programmable hardware solutions is that the software programming models represented today in the marketplace are often focused on extrapolating the execution model and underlying hardware architecture to more efficiently support more applications, not to become hardware independent.

OpenCL supports writing of kernels using the ANSI C programming language with some limitations and additions. It does not allow the use of function pointers, recursion, bit fields, variable-length arrays, and standard header files. The language is extended to support parallelism with vector types and operations, synchronization, and functions to work with work-items/groups. An application programming interface (API) is used to define and then control the platform. OpenCL, at a course-level, supports parallel computing using task-based and data-based parallelism.

Prior art approaches to development of software applications for parallel execution on multiprocessor systems generally require tradeoffs between ease of development and efficiency of parallel execution. In other words, it has generally been the case that the easier the development process for the programmer, the more inefficiently the resulting executable program executes on hardware; and conversely, more efficient execution has generally required significantly more effort by programmers, i.e., to design programs in greater detail to avoid inefficient processing and to use efficiency enhancing features of the target hardware.

Therefore, improved systems and methods are desired for facilitating the software description of the application or system level view to drive the software programming model and its subsequent use to target the execution model and underlying hardware architecture. Improvements are also desired which provide mechanisms that enable efficient programmable implementation of applications through this process. The Message Passing Interface (MPI) is a standardized language-independent, scalable, and portable message-passing communications protocol API. The MPI API is meant to provide essential virtual topology, synchronization, and communication functionality between a set of processes (that have been mapped to nodes/servers/computer instances) in a language-independent way, with language-specific syntax (bindings). The MPI API standard defines the syntax and semantics of a core of library routines that include support for, but are not limited to, various behavior-definable point-to-point and collective/broadcast communication send/receive operations and synchronizing of processes. MPI is the dominant model used in high-performance computing today. Greater progress toward higher performance per Watt of power dissipation at the system level is possible with many processing elements in close communication, distributed fast memory, and more sophisticated software development tools that divide the system into a hierarchy of modules. At the bottom of the hierarchy are tasks assigned to processing elements, supporting memory, and flexible communication pathways across dynamically-configurable interconnection networks.

SUMMARY OF THE EMBODIMENTS

Various embodiments for a multi-processor integrated circuit that includes a plurality of message nodes are disclosed. Broadly speaking, the plurality of message nodes are coupled to a plurality of processor included in the multi-processor in an interspersed arrangement. A particular message node of the plurality of message nodes is configured to receive a first message that includes a payload and routing information and select a different message node of the plurality of message nodes based on the routing information and operational information of the multi-processor. The particular message node is also configured to modify, based on the different message node, the routing information of the first message to generate a second message and forward the second message to the different message node.

BRIEF DESCRIPTION OF THE DRAWINGS

FIG. 6 illustrates a table depicting testing predicate flags.

FIG. 7 illustrates three tables depicting different conditional instructions.

FIG. 8 illustrates conditional block instructions.

FIG. 9 describes data path logic circuits.

FIG. 16 is a table depicting information to be programmed as part of sending a message on a message bus.

Figure 1:
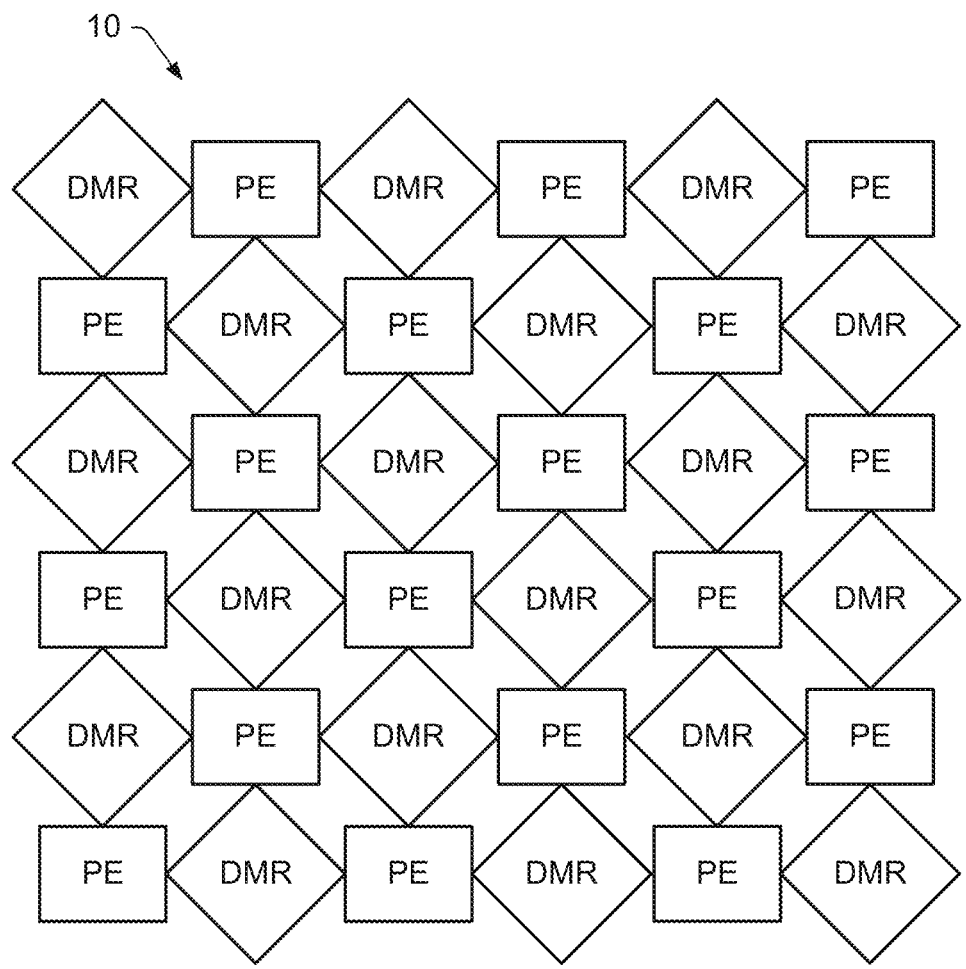
FIG. 1 depicts an embodiment of a multi-processor array.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Flowchart diagrams are provided to illustrate exemplary embodiments, and are not intended to limit the disclosure to the particular steps illustrated. In various embodiments, some of the method elements shown may be performed concurrently, performed in a different order than shown, or omitted. Additional method elements may also be performed as desired.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component. More generally, the recitation of any element is expressly intended not to invoke 35 U.S.C. § 112, paragraph six interpretation for that element unless the language "means for" or "step for" is specifically recited.

DETAILED DESCRIPTION OF EMBODIMENTS

Turning to FIG. 1 a block diagram illustrating one embodiment of a multi-processor system (MPS) is depicted. In the illustrated embodiment, MPS 10 includes a plurality of processor elements (PEs) and a plurality of data memory routers (DMRs), which may also be referred to as dynamically configurable communicators, or dynamically configurable communication elements, coupled to communicate data and instructions with each other. As used herein, a PE may also be referred to as a PE node, and a DMR may also be referred to as a DMR node.

Figure 2:
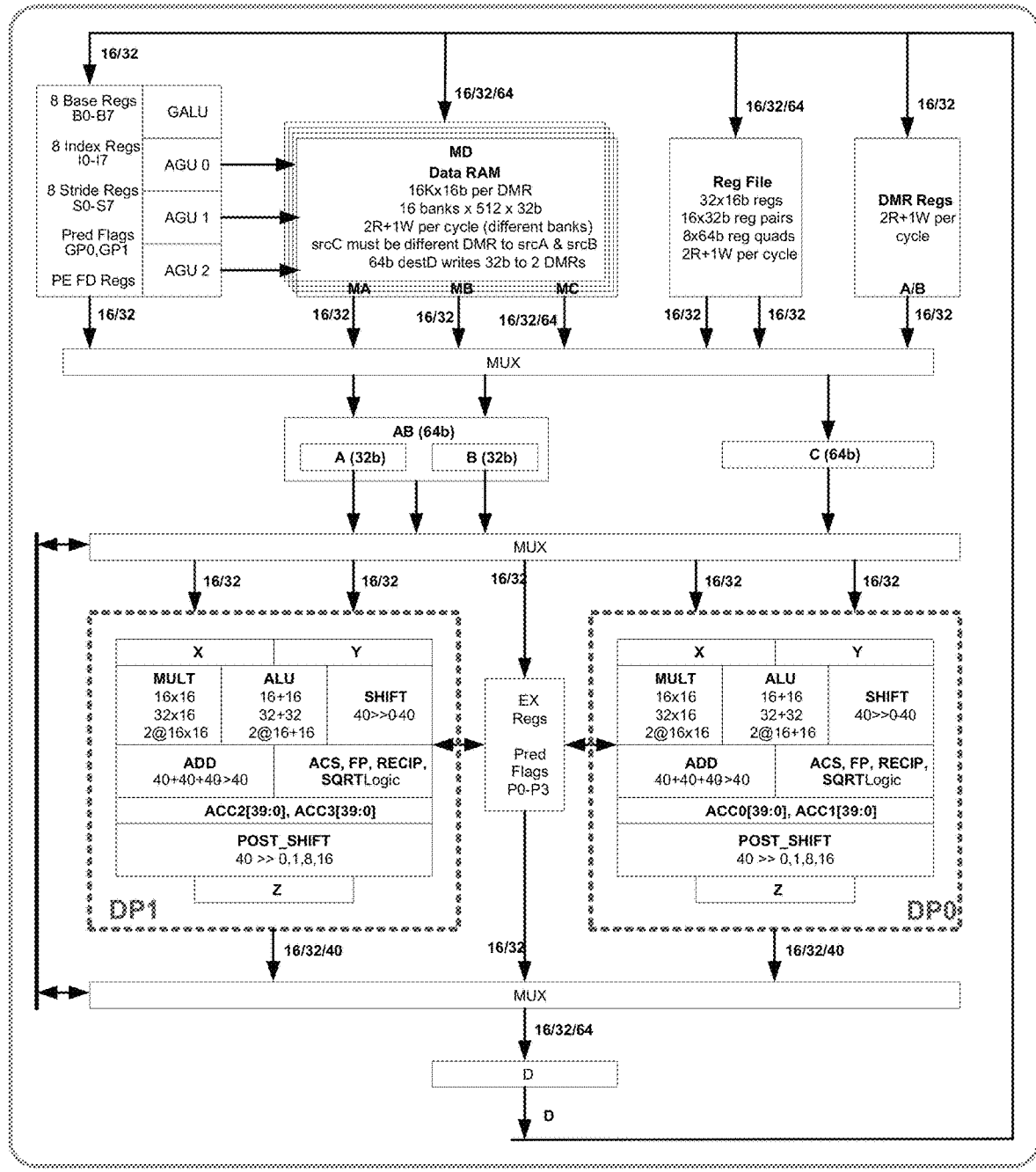
FIG. 2 depicts an embodiment of a data path of a PE.
Figure 3:
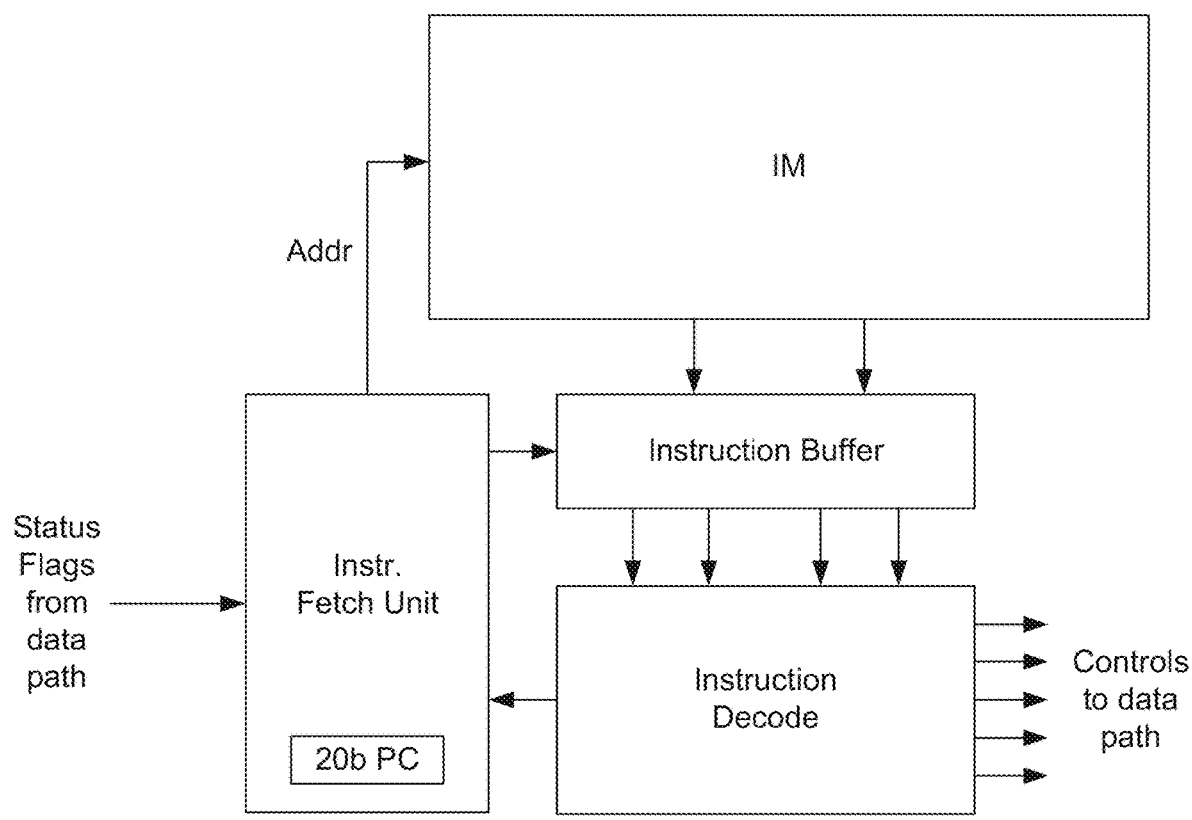
FIG. 3 is a block diagram of an embodiment of an instruction decoder.

A data path diagram for an embodiment of a dual/quad processing element (PE) and its local supporting memory (SM) for data is shown in FIG. 2. The top left corner of FIG. 2 shows the Address Generator for the SM for data (Data RAM), and the top right shows a register file and some control registers for the Data Memory Router (DMR). A DMR is a node in an primary interconnection network (PIN) between PEs. A large MUX is used to switch the different data sources into the main input operand registers, A, B, and C. Another large MUX switches the operand data to the X and Y inputs of the arithmetic pipelines, DP1 and DP0. A third large MUX switches the arithmetic pipelines outputs Z1 and Z0 to data paths D back to register files or Data RAM. Data RAM is shared with adjacent PE and access conflicts are arbitrated by hardware. Control of the pipelines comes from the instruction decode block in FIG. 3.

Figure 4:
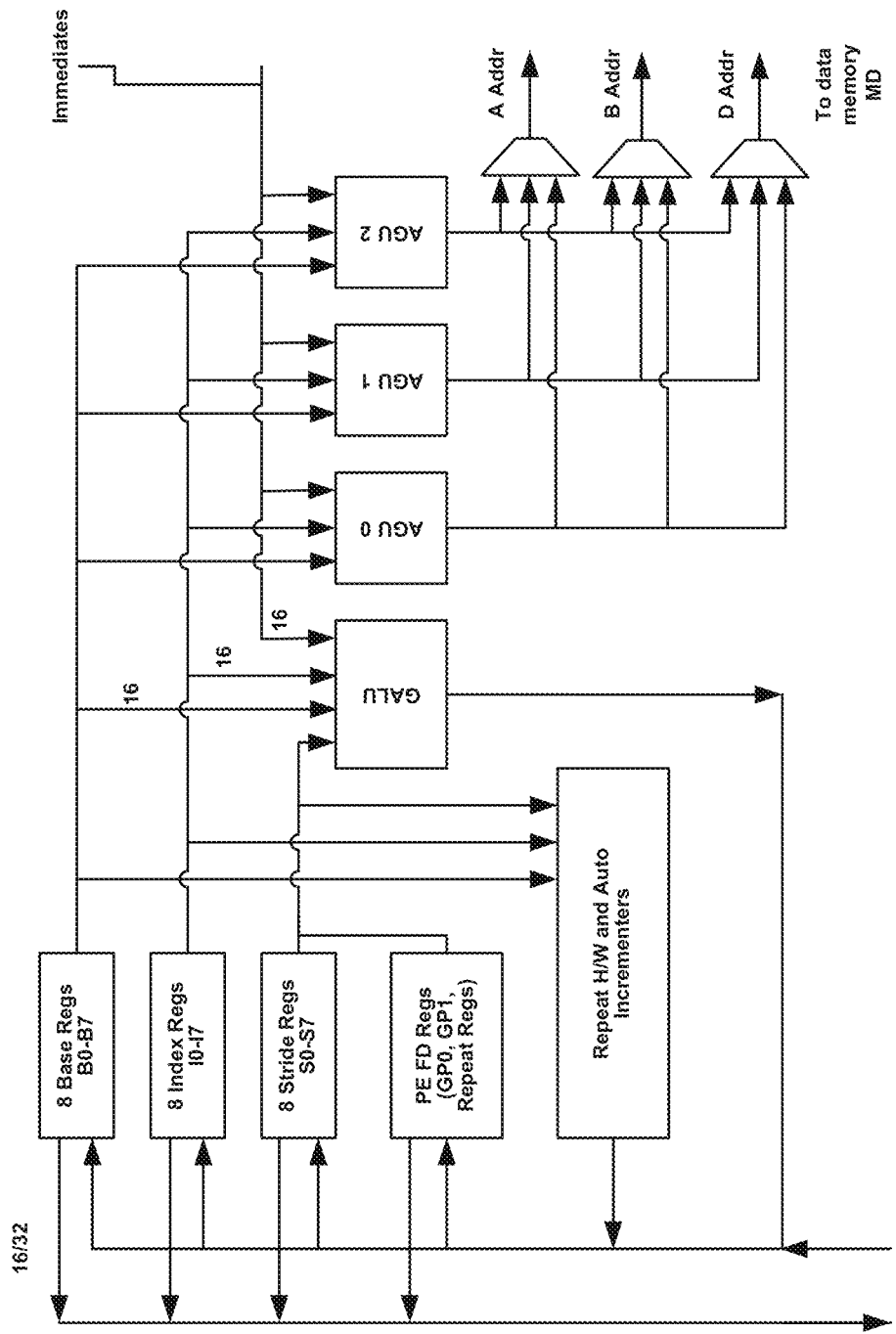
FIG. 4 is a block diagram illustrating an embodiment of an address generator.

Referring to the Address Generator in FIG. 4, programmable arithmetic units have been included to support sophisticated address calculations that may begin several operations ahead of address actual use. The Address Generator shown in FIG. 4, includes three integer addition units (AGU0, AGU1, and AGU2), a general purpose integer ALU (GALU) and a box for "Repeat H/W and Auto Incrementers". Registers support nested loops with up to eight indexes with independent base and stride values. Additional general purpose registers support the GALU and repeat unit. Output multiplexers support the routing of any computed address to the A, B or D address ports of the Data RAM.

Conditional execution of instructions is supported by execution registers and predicate flags shown at the center of FIG. 2. Making instruction execution depend on execution status and predicates is prior art. If all instructions finished after a specific number of clock cycles, every time, then conditional execution would likely not be a benefit. But in many cases a critical instruction can finish in fewer clock cycles, providing a result that the next instruction needs or multiple instructions need. If these next instructions are conditioned to wait for a status bit, they may begin sooner in those cases. A predicate is a few bits that may be used by conditional instructions more generally, not just to wait but also to select and branch. Some instructions are also used to set/clear predicate values.

Figure 5:
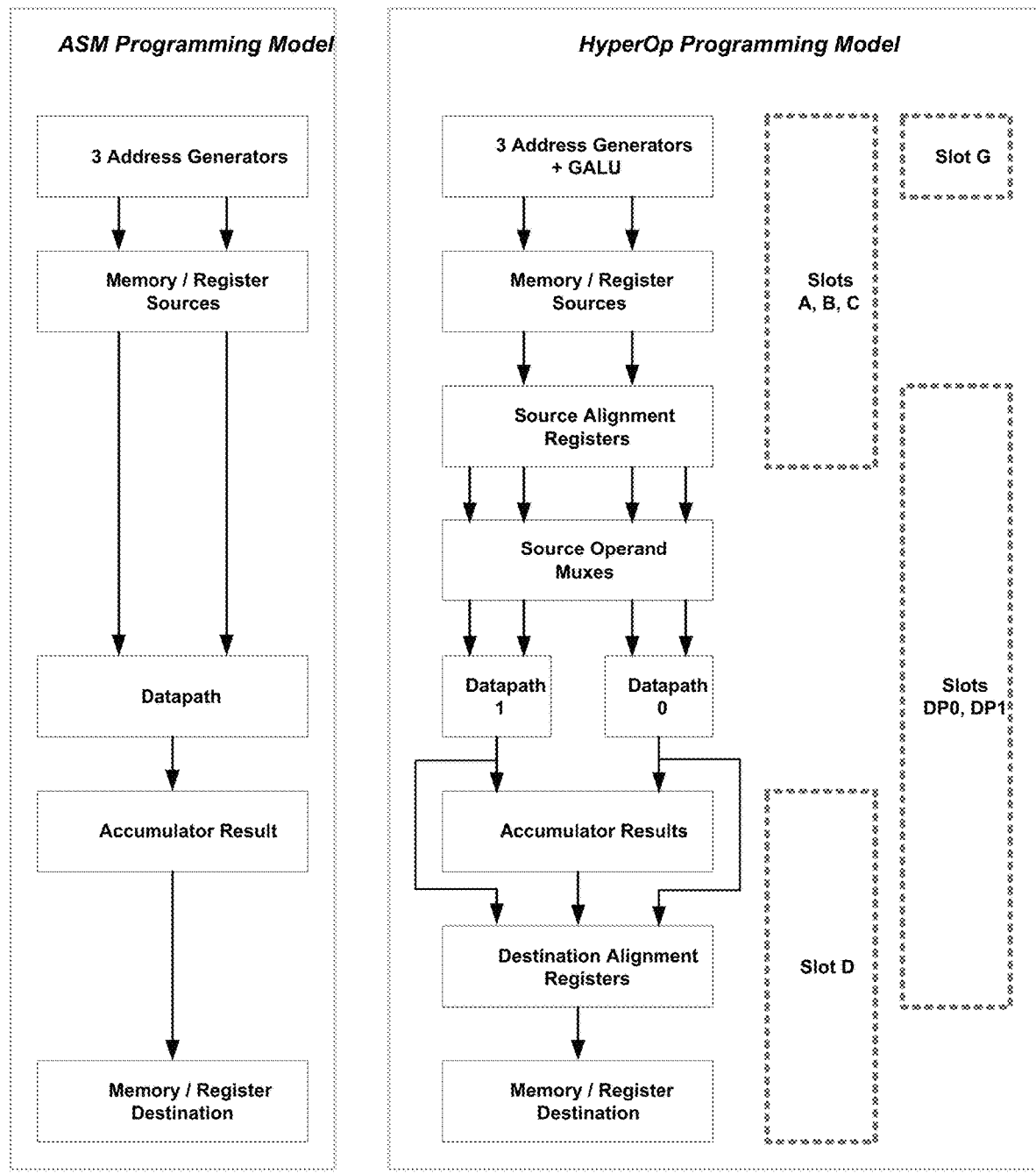
FIG. 5 is a block diagram comparing programming models.
Figure 10:
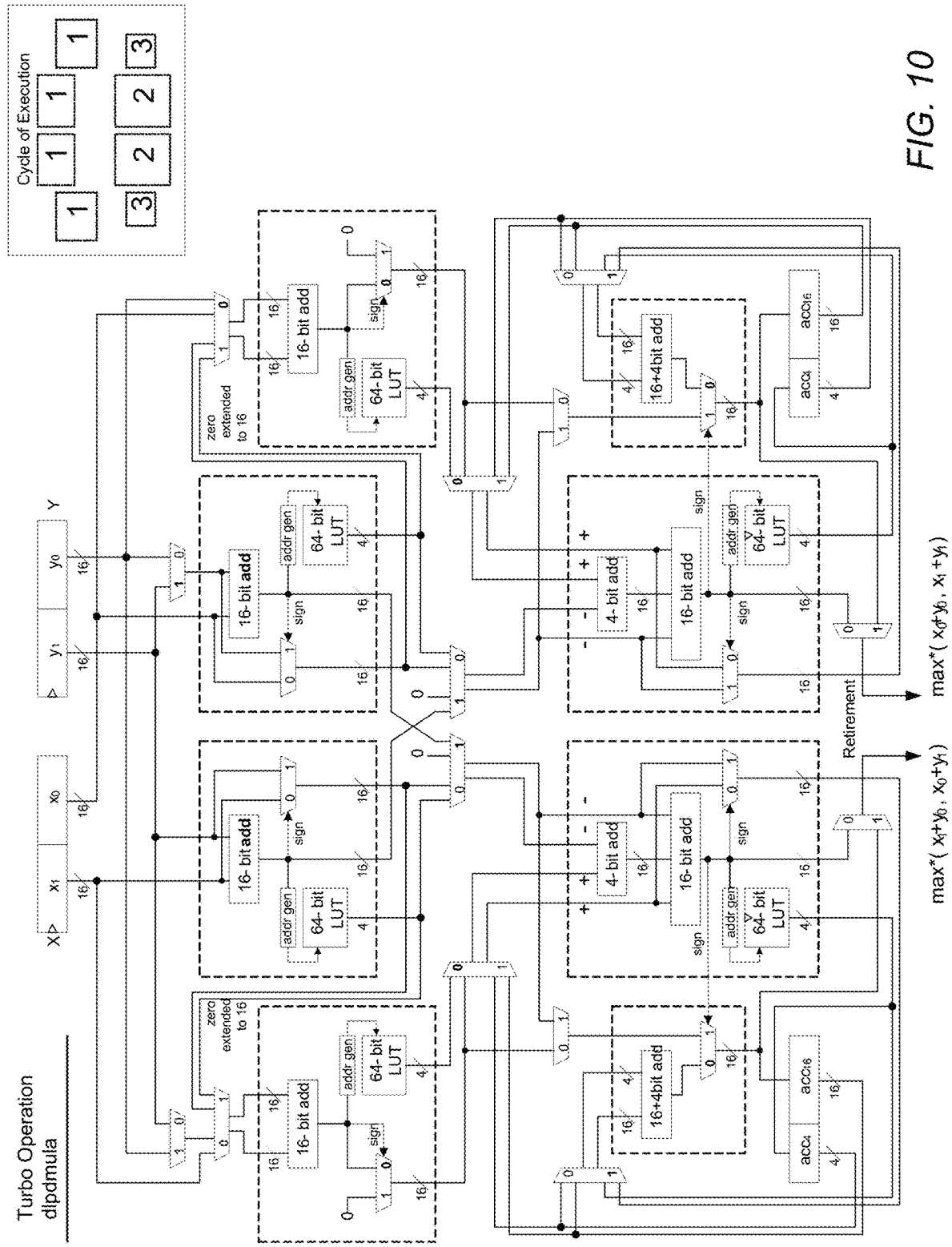
FIG. 10 is a block diagram illustrating active logic circuits for a turbo instruction.
Figure 11:
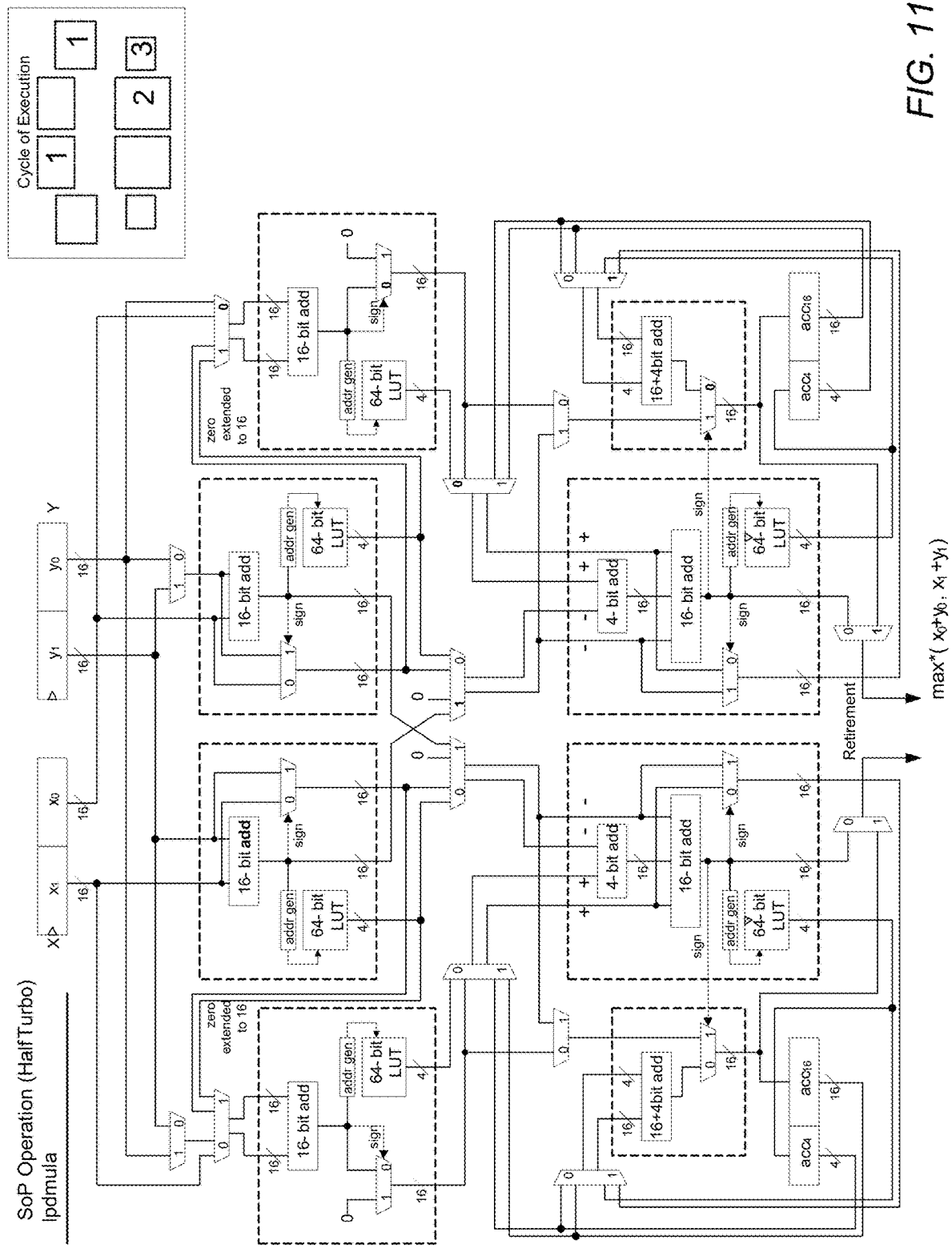
FIG. 11 is a block diagram illustrating active logic circuits for a half-turbo instruction.
Figure 12:
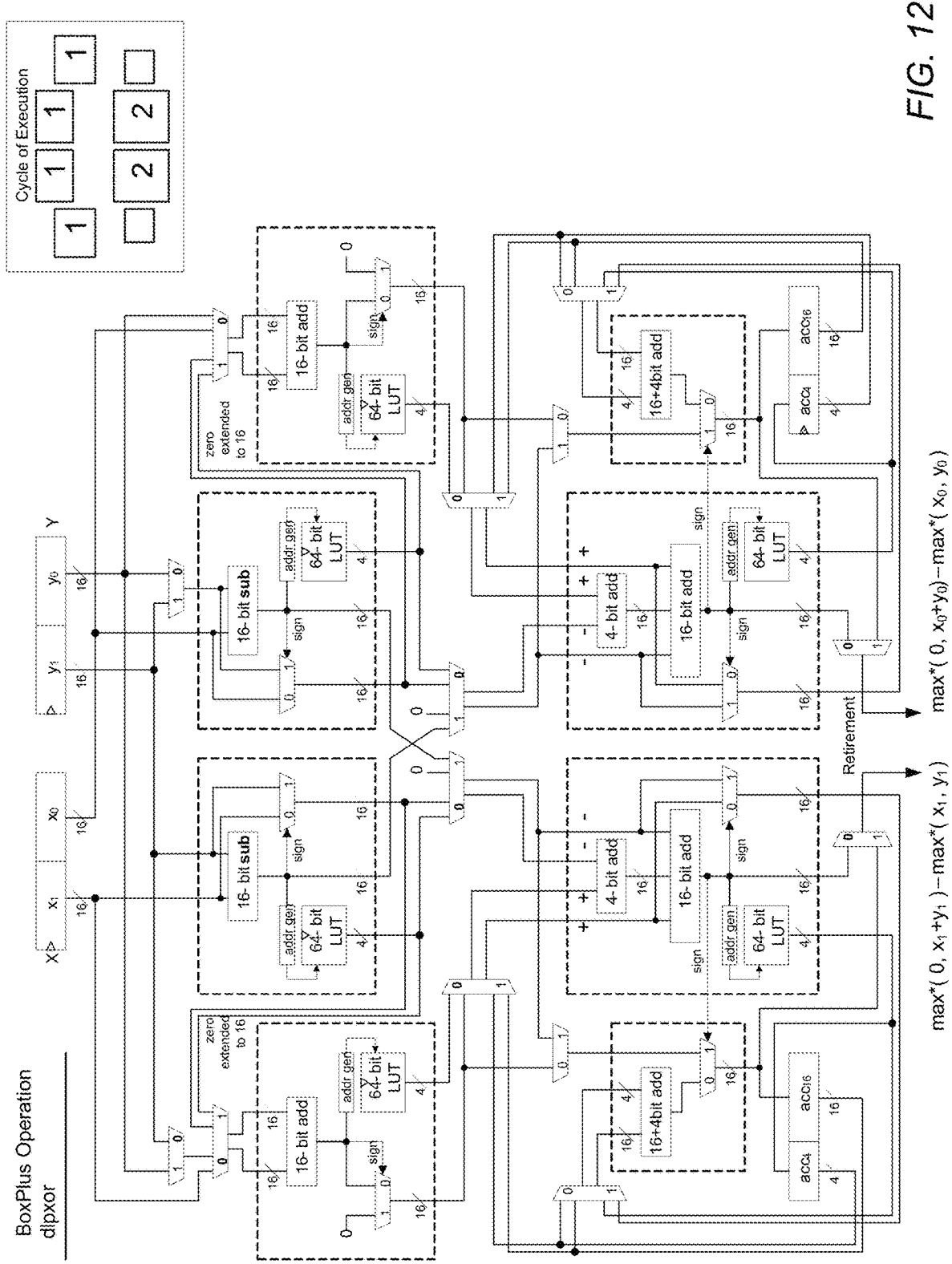
FIG. 12 is a block diagram illustrating active logic circuits for a box plus instruction.
Figure 13:
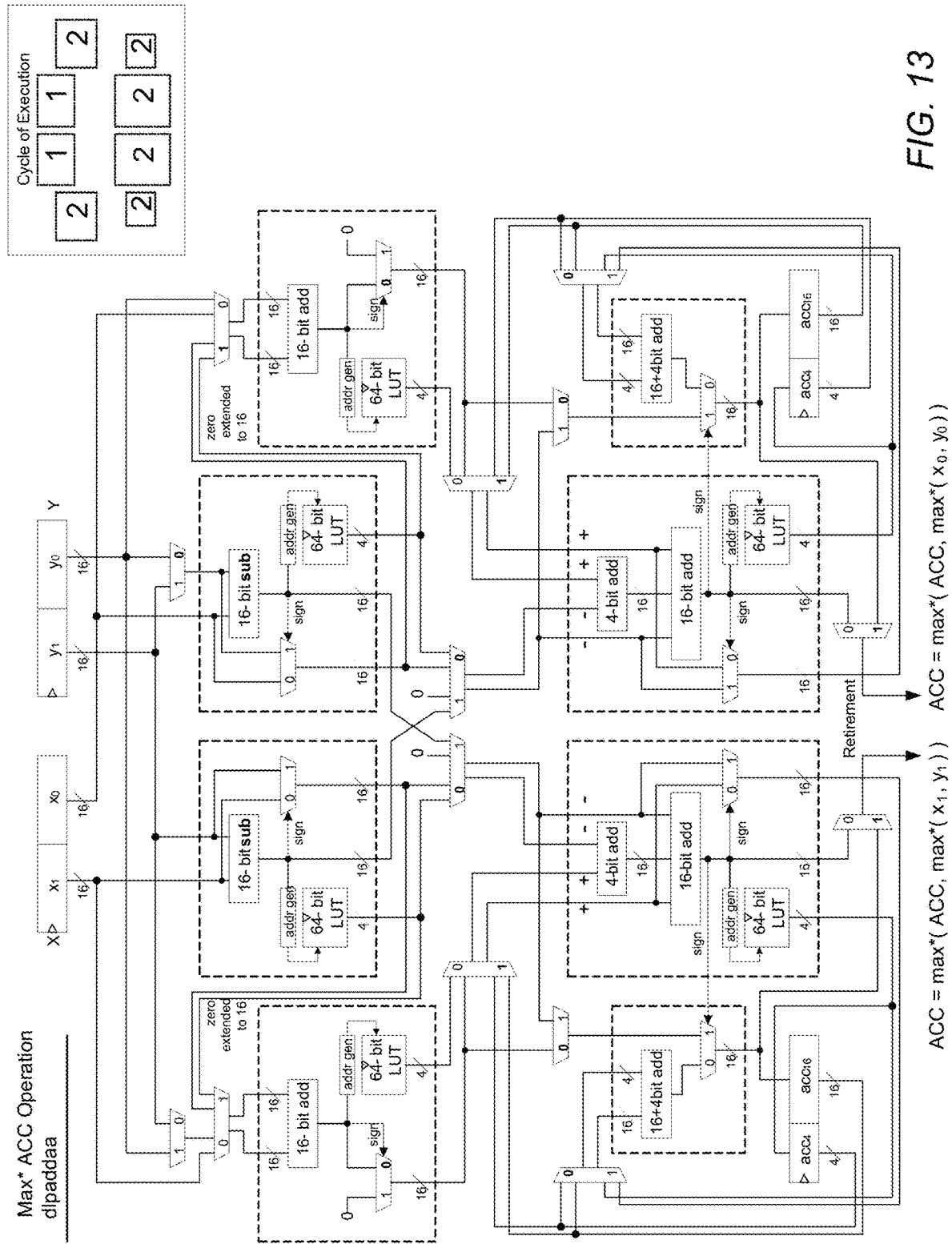
FIG. 13 is a block diagram illustrating active logic circuits for a Max* instruction.
Figure 14:
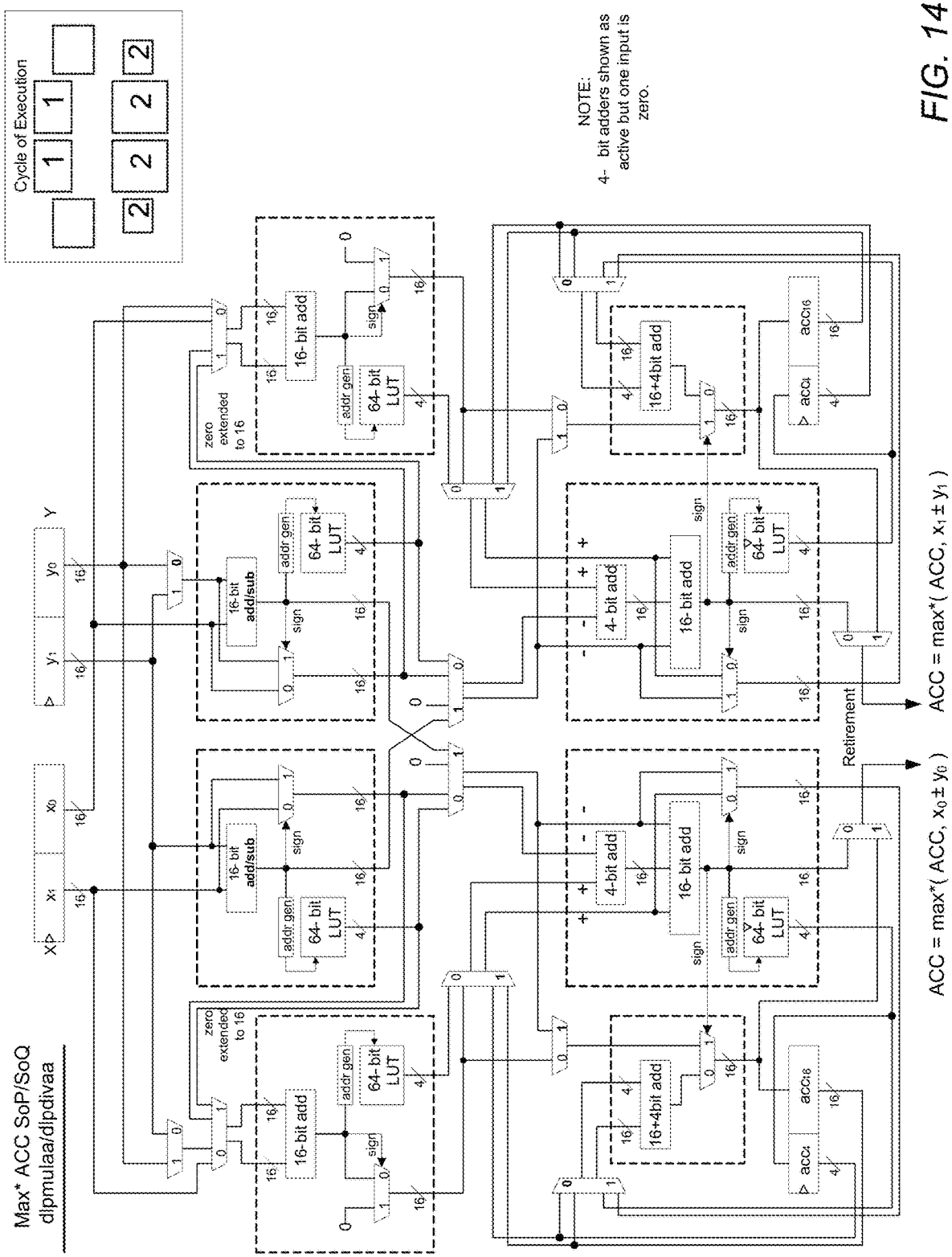
FIG. 14 is a block diagram illustrating active logic circuits for another Max* instruction.

In various embodiments, PEs may support programs that intermix two types of instructions, 64 bit and 128 bit. The shorter instructions support Assembly language programming model as shown on the left of FIG. 5, below. This is useful to support legacy code and simpler compilers. The longer 128 bit instructions support the "HyperOp" programming model shown on the right of FIG. 5. The longer instructions are needed to more precisely control the dual datapath hardware and make it more efficient for signal processing, thus boosting performance for a given power dissipation (Pdiss), however, the programming needs to be more sophisticated.

In the PE architectures FIG. 2, detailed scheduling of operations within each pipeline is defined by program compilation (in contrast with hardware-assisted scheduling in other architectures). However, PE instructions are designed for conditional execution, wherein the conditions for execution depend on registered values of execution status and predicates. In some cases, there are six predicates that appear in pairs, two pairs in each data path, and one pair in the address generator. A single conditional instruction can access a single pair of predicates, but over more instructions all the predicates can be accessed. In some embodiments, conditional execution may be used to optimize PE performance in the dual pipeline or many-processor IC context. Conditional execution may, in various embodiments, improve the average speed/power ratio (also referred to as "speed/Pdiss ratio"), based on each application's algorithm flow structure details.

In various embodiments, the PEs included in the embodiment of FIG. 1 may include the following features:
    Two datapaths, each capable of (per cycle):
        One/two 16×16 multiplies or one 32×16 multiply
        One/two 16b add/subtracts or one 32b add/subtract
        40b barrel shift
        32b logic operation
    40b accumulation, two 40b accumulators
        Together the datapaths can perform (per cycle):
        One 32×32 multiply or multiply-accumulate
    One 32b floating point add/subtract/multiply
        Three Address Generation Units (AGUs):
        Three loads: srcA, srcB, srcC
        Two loads and one store: srcA, srcB, dstD
        Eight Base Registers and Eight Index Registers
    GP Register File
        32×16b registers, accessible as 16×32b registers or 8×64b registers
    Instruction Decode:
        64b conventional assembly instructions
        128b HyperOp instructions
        IM provides 128b/cycle on any 64b alignment
    Repeat loop hardware
        Zero overhead looping
        Supports three levels of nesting, using three primary index regs
        Auto-increment of four secondary base/index regs
    Loop Buffer
        Reduces instruction fetch power during inner loop[s]

There is repeat loop hardware built into the design to provide iteration of small sections of code. This hardware may include index counters, increment/decrement logic, completion test and branch functions more efficiently than execution of software instructions to do these "overhead" functions. Done properly this hardware removes the instruction cycles to perform the overhead functions. Zero overhead looping for up to three-levels of nesting may be provided using a REPEAT instruction which directly programs hardware state machines that execute the looping without software instructions for overhead functions. Indexing is managed automatically so that additional instructions are usually not required within the loop to manage the address calculations of the operands. This allows for multiple arrays to be accessed and managed without additional instruction overhead in the loop, saving power and providing better performance. In various embodiments, the repeat loop hardware may include:
    Eight Base Registers B0 . . . B7
        B0 in addressing modes yields a value of zero
        B0 is used as Stack Pointer (SP Relative addressing modes)
    Eight Index Registers I0 . . . I7
        I0 in addressing modes yields a value of zero
        I0 can be used as a temp register for other AGU arithmetic (This is named GR0 in register map—not I0)
    Seven Stride Registers S1 . . . S7
        Sn used with In or Bn
    Hardware support for 3 levels of repeat loop
        Primary loop indexes are I1, I2, I3
    Four additional incrementers for secondary indexes or base registers
        Index registers I4 . . . I7
        Base registers B4 . . . B7
        Increment by Stride registers S4 . . . S7
        Start Address/Temp Registers T4 . . . T7
    Repeat loops are controlled by the REPEAT instruction:
    REPEAT is similar to the previous HyperX generation, with the following improvements:
    Primary loop indexes I1, I2, I3
    Option to select up to 4 Base/Index registers to be incremented at end of loop: I4/B4, I5/B5, I6/B6, I7/B7.
    Repeat loop information is loaded into loop registers prior to labels that define loop instructions.

The Repeat Buffer is an instruction FIFO for holding instructions that comprise repeat loops. The goal is to reduce instruction fetch power consumption during the most time consuming sections of code. The allocation of the instructions to the buffer is determined at compile time by the HyperX tools and is not left to the user to determine. It is described here only to provide a basic understanding to the user. The main features of the Repeat Buffer may include:
    The group of instructions is determined by a REPEAT instruction and its labels.
    The repeat buffer usage is determined at compile time and indicated in the REPEAT instruction by a flag.
    The first instruction of every repeat loop is always loaded into the repeat buffer for performance and power reasons.

The buffer can hold either 64b or 128b instructions.

A maximum of 12-64b entries is available. Two entries are used for 128b instructions.

An entire loop must fit in the buffer in order for it to be used for anything other than buffering the first instruction of the loop.

The primary indexes (I1-I3) and the associated other control registers are used by the repeat hardware to control the loop operation. In addition to the primary hardware there is another set of registers that can be automatically managed by the repeat hardware for additional address calculations by the AGUs. These extra registers are:

B4-B7—four additional BASE registers.
I4-I7—four additional INDEX registers.
S4-S7—four additional STRIDE registers.
T4-T7—four additional registers used to initialize either the BASE or INDEX registers.

There are four additional adders available to perform additions on these registers. These adders can be controlled by instructions (INIT and INCR) or by the Auto Increment feature of the REPEAT instruction and hardware. Using the AUTOINC registers described elsewhere in this document each primary REPEAT operation can be tied to also perform address additions on one or more secondary INDEX or BASE registers.

Each adder can be used to add a given STRIDE (S4-S7) to either a same numbered BASE (B4-B7) or the same numbered INDEX (I4-I7) to each iteration through the loop for any primary index (I1-I3). In addition, whenever the top of loop indication causes the primary index to be loaded with a starting value the indicated AUTOINC BASE or INDEX will be loaded with the like numbered T register (T4-T7). This allows for multiple arrays to be accessed and managed without additional instruction overhead in the loop, saving power and providing better performance.

In various embodiments, conditional execution may be based on predicate flags. Such flags may include:

P0-P3:
    set by DP test instructions
    set according to DP timing
GP0 & GP1:
    set by AGU test instructions (examples are shown in FIG. 6)
    set according to AGU timing Predicate Flags are set using the TEST class of instructions which perform the following:
    Execute a TEST operation
    Check for a resulting condition
    Set the selected Predicate Flag

TABLE 1

AGU Test instructions

| Test Operation | Test Conditions | Instruction | Description |
|---|---|---|---|
| Bit Compare | EQ, NE | GTCMPB bit tcond grA grB GPn | Bit compare grA[bit] with grB[bit], test for condition, set GPn to boolean TRUE/FALSE |
| Arithmetic Compare | LT, LE, GT, GE, EQ, NE | GTCMP tcond grA grB GPn | Arithmetic compare grA with grB, test for condition, set GPn to boolean TRUE/FALSE |
| Logical AND | ZERO, NONZERO, ALLONES | GTAND tcond grA grB GPn | Logical AND grA with grB, test for condition, set GPn to boolean TRUE/FALSE |
| Logical XOR | ZERO, NONZERO, ALLONES | GTXOR tcond grA grB GPn | Logical XOR grA with grB, test for condition, set GPn to boolean TRUE/FALSE |

TABLE 2

DP Test instructions

| Test Operation | Test Conditions | Instruction | Description |
|---|---|---|---|
| Bit Compare | EQ, NE | TCMPB bit tcond srcA srcB Pn | Bit compare srcA [bit] with srcB [bit], test for condition, set Pn to boolean TRUE/FALSE |
| Arithmetic Compare | LT, LE, GT, GE, EQ, NE | TCMP tcond srcA srcB Pn | Arithmetic compare srcA with srcB, test for condition, set Pn to boolean TRUE/FALSE |
| Logical AND | ZERO, NONZERO, ALLONES | TAND tcond srcA srcB Pn | Logical AND srcA with srcB, test for condition, set Pn to boolean TRUE/FALSE |
| Logical XOR | ZERO, NONZERO, ALLONES | TXOR tcond srcA srcB Pn | Logical XOR srcA with srcB, test for condition, set Pn to boolean TRUE/FALSE |
| Range | In range | TRANGE srcA srcB Pn | Test that srcA is in range: srcB.L <= srcA <= srcB.H, set Pn to Boolean TRUE/FALSE |

Conditional instructions specify a test on a pair of predicate flags. For example:

GP0, GP1—used by AGU instructions
P0, P1—used by DP instructions, typically in DP0
P2, P3—used by DP instructions, typically in DP1

An example of testing the predicate flags is illustrated in FIG. 6. Additionally, DP conditional instructions, AGU conditional instructions, and program flow instructions are illustrated in FIG. 7.

Conditional block instructions are illustrated in FIG. 8. The description of instructions illustrated in FIG. 8 is simplified version of the real operation. The STARTIF, ELSE, ENDIF instructions are nest-able; so there is a Condition Stack that holds the nested condition states. A STARTIF pushes the new condition state onto the Condition Stack, an ELSE toggles the current condition state (top of stack), an ENDIF pops the Condition Stack. The current condition state may inhibit the operations of STARTIF, ELSE and ENDIF.

Hyper-Ops may be executed in various ways. An example of hyper-op execution is illustrated in Table 3.

TABLE 3

| Hyper-Op Execution | | |
|---|---|---|
| Conditional Operation | Predicate Flags | HyperOp Syntax |
| Unconditionally execute all slots | | { \|A\| slotA; \|B\| slotB; \|C\| slotC; \|DP0\| slotDP0; \|DP1\| slotDP1; } {\|A\| slotA; \|B\| slotB; \|DP0\| slotDP0; \|DP1\| slotDP1; \|D\| slotD; } { \|A\| slotA; \|B\| slotB; \|G\| slotG; \|DP0\| slotDP0; \|DP1\| slotDP1; } { \|A\| slotA; \|G\| slotG; \|DP0\| slotDP0; \|DP1\| slotDP1; \|D\| slotD; } { \|A\| slotA; \|G\| slotG; \|C\| slotC; \|DP0\| slotDP0; \|DP1\| slotDP1; } |
| Conditionally execute selected slots according to a single specified condition cond. Selection control for slots corresponding to: AG0, AG1, AG2. Unconditionally execute DP slots, but DP slots can execute CMOV instructions with independent conditions cond0 and cond1. Only available when no slotG instruction. | cond: GP0, GP1 | { \|A(cond)\| slotA; \|B(cond)\| slotB; \|C(cond)\| slotC; \|DP0\| slotDP0; \|DP1\| slotDP1; } |
| Conditionally execute selected slots according to a single specified condition cond. Selection control for slots corresponding to: AG0, AG1, AG2. Unconditionally execute DP slots, but DP slots can execute CMOV instructions with independent conditions cond0 and cond1. Only available when no slotG instruction. | cond: P0, P1 | { \|A(cond)\| slotA; \|B\| slotB; \|C\| slotC; \|DP0\| slotDP0; \|DP1\| slotDP1; } { \|A(cond)\| slotA; \|B\| slotB; \|DP0\| slotDP0; \|DP1\| slotDP1; \|D(cond)\| slotD; } { \|A(cond)\| slotA; \|C\| slotC; \|DP0\| slotDP0; \|DP1\| slotDP1; \|D(cond)\| slotD; } |
| Conditionally execute selected slots according to a single specified condition cond. Selection control for slots corresponding to: AG0, AG1, AG2. Unconditionally execute DP slots, but DP slots can execute CMOV instructions with independent conditions cond0 and cond1. Only available when no slotG instruction. | cond: P2, P3 | { \|A(cond)\| slotA; \|B\| slotB; \|C\| slotC; \|DP0\| slotDP0; \|DP1\| slotDP1; } { \|A(cond)\| slotA; \|B\| slotB; \|DP0\| slotDP0; \|DP1\| slotDP1; D(cond) slotD; } { \|A(cond)\| slotA; \|C\| slotC; \|DP0\| slotDP0; \|DP1\| slotDP1; \|D(cond)\| slotD; } |
| Conditionally execute any DP instructions in DP slots, with independent conditions cond0 for DP0 and cond1 DP1. Unconditionally execute all other slots. Only available when no slotG instruction. | cond0: P0, P1 cond1: P2, P3 | { \|A\| slotA; \|B\| slotB; \|C\| slotC; \|DP0(cond0)\| slotDP0; \|DP1(cond1)\| slotDP1; } { \|A\| slotA; \|B\| slotB; \|DP0(cond0)\| slotDP0; \|DP1(cond1)\| slotDP1; \|D\| slotD; } { \|A\| slotA; \|C\| slotB; \|DP0(cond0)\| slotDP0; \|DP1(cond1)\| slotDP1; \|D\| slotD; } |

GPn are ready on the next cycle, therefore no branch prediction is required if a GTEST instruction is used to set these bits. However, if a GPn bit is being written by a MOV from a general purpose register then it will be delayed and normal branch prediction is performed. Pn are ready after five cycles, therefore branch prediction is required. The misprediction penalty is 5-n cycles, where n is the number of instruction cycles between the test instruction and the branch. If the test instruction can be moved forward in the code, n can be increased and the misprediction penalty reduced, possibly to zero (0) cycles.

Because predicates are calculated using explicit instructions to set them and are not modified by other instructions it is often possible to schedule code to greatly reduce any penalties associated with mispredicted branches. Branch prediction may be made static and determined at compile time based on industry standard heuristics for branch probabilities.

The Hyper-Op mode may allow for instructions to be encoded where each separate part of the datapath is controlled by part of the instruction encoding. This allows more direct control of the parallelism of the hardware. The 128-bit Hyper-Op formats allow the parallelism depicted in Table 4.

TABLE 4

| Hyper-Op Parallelism | | | | | | | |
|---|---|---|---|---|---|---|---|
| cond | slotA | slotB | slotC | slotG | slotDP0 | slotDP1 | slotD |
| X | X | X | X | | X | X | |
| X | X | X | | | X | X | X |
| X | X | | X | X | | X | X | X |
| | X | X | | X | X | X | |
| X | | | | X | X | X | X |
| X | | | X | X | X | X | |

There are restrictions on which HyperOp instructions can execute in parallel in DP0 and DP1. Two HyperOp instructions can execute in parallel if they have the same latency. By definition, DP0 and DP1 slots can always execute identical instructions in parallel (equivalent to SIMD). There are a few exceptions. Only a single FP instruction can run in both DP slots as hardware from both datapaths is used in these calculations. Note that while the SIMD form of executing the same instruction is supported, the usage model is much more flexible in allowing any two instructions that have the same latency to execute in parallel.

Address instructions happen during the FD pipeline stages, take 1 cycle and the results are available to be used by all load/store instructions in the next cycle. In various embodiments, auto-increments and repeats include reloads to reduce overhead.

Each DMR may have direct memory access (DMA) engines to support multi-point sources and multi-point destinations at the same time. Moreover, the complete state of each DMA engine may be captured and saved in memory; this state information may be later retrieved to restart a DMA operation where it was interrupted. The ability to save the state of a DMA configuration requires the PE to read up to 11 DMA registers in order to obtain the entire state of the DMA. Many of these registers were internal DMA registers that were exposed to external accesses for the purpose of capturing state.

In order to save register space, the DMA could save its state to memory in a compact form called a descriptor. The PE would specify the starting location of this descriptor, and the DMA and a modified push engine could write the register data to memory starting at the specified memory address. The push engine is a part of the DMA engine that is used to extend a routed message from one destination DMR to a second destination DMR.

The push engine already has a state machine that steps through each register in the DMA in order to program it. This same mechanism can also be used to read registers. The read data would then need to be channeled into the adjacent in-port module. A critical piece will be to tie any DMA write stalls into the push engine. This may be done by gating the DMA stalls on the push engine's busy input signals.

The DMA wakeup can be used to signal to the PE that the descriptor has been saved. At that point, the PE is free to swap tasks. Once the new task has completed, the PE can point to the saved descriptor, and the DMA process will resume. In is noted that the router in-port or out-port will need to be configured properly between task swaps.

Stores of accumulators have an optional post-shift right by predetermined shift amounts. In various embodiment the following shift amount are:
1: for averaging
8:
16: for storing ACCH=ACC[31:16]
15:

These values are stored in three shift fields that are used as indirect shift amounts. The three fields are signified in the HyperOp syntax as SHR1, SHR2, & SHR3 and refer to the shift value fields SHIFT_CTL1-3 in the PE_CONFIG1 register.

There are two types of Accumulator Pair: One accumulator from each DP (ACC2_ACC0, ACC2_ACC1, ACC3_ACC0, ACC3_ACC1) and two halves of an accumulator, treated as SIMD 16b data (ACC0H_ACC0L, ACC1H_ACC1L, ACC2H_ACC2L, ACC3H_ACC3L). Store with post shift of an accumulator pair performs independent shifts on each part of the accumulator pair, although the number of bit positions is the same. In the following descriptions the "tmp" designation is used to try to clarify the semantics and is not an actual hardware register.

TABLE 5

Accumulator Pairs

| Instruction | Operands | Semantics | Description |
| --- | --- | --- | --- |
| ST16 [>>shr] | ACCn, dstD | tmp[39:0] = ACCn[39:0] >> shr dstD[15:0] = tmp[15:0] | Shift ACCn right by shr and store LS16b of shifted ACCn to dstD. ACCn = {ACC0 . . . ACC3} |
| DST16 [>>shr] | ACCPn, dstD | tmp0[39:0] = ACCPn[39:0] >> shr tmp1[39:0] = ACCPn'[39:0] >> shr dstD[15:0] = tmp0[15:0] dstD[31:16] = tmp1[15:0] | Shift each accumulator of accumulator pair ACCPn right by shr. Store 32b (LS16b:LS16b of shifted ACCs) to dstD. Independent 16b writes for conditional (cond) slotD. Sign_extended. ACCPn = { ACC2_ACC0, ACC2_ACC1, ACC3_ACC0, ACC3_ACC1} |
| ST32 [>>shr] | ACCn, dstD | tmp[39:0] = ACCn[39:0] >> shr dstD[31:0] = tmp[31:0] | Shift ACCn right by shr and store LS32b of shifted ACCn to dstD. ACCn = {ACC0 . . . ACC3}. Sign_extended |
| DSTS32 [>>shr] | ACCPn, dstD | tmp0[39:0] = ACCPn[39:0] >> shr tmp1[39:0] = ACCPn'[39:0] >> shr dstD[31:0] = tmp0[31:0] dstD[63:32] = tmp1[31:0] | Shift each accumulator of accumulator pair ACCPn right by shr. Store 64b (LS32b:LS32b of shifted ACCs) to dstD. dstD[63:32] -> DMRn[addr[13:0] ] dstD[31:0] -> DMRn' [addr[13:0] ] Independent 32b writes for cond slotD. Sign_extended ACCPn = { ACC2_ACC0, ACC2_ACC1, ACC3_ACC0, ACC3_ACC1} |
| STS64 [>>shr] | ACCn, dstD | dstD[63:0] = sign_ext(ACCn [39:0] >> shr) | Shift accumulator ACCn right by shr. Store 40b ACC as 64b (zero ext) to dstD. Sign_extended dstD[63:32] -> DMRn [addr[13:0] ] dstD[31:0] -> DMRn' [addr[13:0] ] ACCn = {ACC0 . . . ACC3} |

Note:
the >>shr syntax uses the names SHR1, SHR2, & SHR3 to point to the shift fields in PE_CONFiG1.

Shifting may also be done in split stores and loads. More shift options generally increases hardware power dissipation (Pdiss). In various embodiments, shift-hardware design may be guided by selecting the most needed shift options for a given Pdiss budget. The most needed shift options may be determined by analyzing application code and PE architecture. In some embodiments, for example where memories are word-addressed instead of byte addressed, the most need may be for shifts that align bytes to/from word boundaries.

In some embodiments, additional auxiliary compute units may be employed for increased performance. A listing of possible auxiliary compute units is depicted in Table 6.

TABLE 6

Auxiliary Computer Units

| Instruction | Operands | Semantics | Description |
|---|---|---|---|
| DIV16U | X, Y, Z | Z[31:0] = X[15:0]/Y[15:0] | Standard Divide-because it is iterative it does NOT have a throughput of 1. 16 bit math results in 16.16 result with MSW = quotient & LSW = remainder |
| DIV32U | X, Y, Z | Z[31:0] = quotient (X[31:0]/Y[31:0]) | Standard Divide-because it is iterative it does NOT have a throughput of 1. Result is 32 bit quotient |
| SQRT16U | X, Z | Z[15:0] = square_root(X[15:0]) | 16b/32b Square Root. These return 8.8 or 16.16 results where the high bits are the integer and the low bits are the fraction. |
| SQRT32U | X, Z | Z[31:0] = square_root(X[31:0]) | |

HyperOp instructions—enable individual control of the dual data paths using static scheduling in the program compilation process. The execution threads are exposed to the compiler to let it statically schedule all operations. In comparison compilers for modern GPP architectures put related instructions together in the machine code but the fine detail of operation scheduling is done by (power consuming) hardware. Static scheduling saves considerable run-time Pdiss.

During transmission of data, imperfections in a system can result in distortion or degradation of transmitted signals. Such distortion or degradation of the transmitted signal may result in values of data bits being incorrect at a receiver circuit. To remediate such effects, in some embodiments, instructions have been included to support Forward Error Correction (FEC) encoding and decoding. FEC finds application in digital communications of all sorts, and other fields such as digital recording and playback from storage media. The basic idea is to take a block of arbitrary input data and encode it with additional parity bits in such a way as to enable bit error correction at the receiver or playback electronics. The encoded block of data and parity bits is called an FEC frame. The FEC frame may be further processed by a modulator, then transmitted into a medium (wired, wireless, or a storage medium).

At a receiver the signal is picked up by an antenna or transducer, amplified, demodulated, and sampled by an A to D converter (ADC). The signal in the media may have acquired interference, fading and echoes; and noise may have been added by the receiver. The output of the ADC is a sequence of digital samples. There are a variety of ways to take a sequence of samples, obtain synchronization, and format them into a FEC frame; but these are tangential to the FEC calculations and won't be described here. Each bit position in the formatted FEC frame has a digital value that may be referred to as a soft bit, represented by the real bits of an integer number in a digital system.

FEC decoding is the process of taking the soft bits in a formatted FEC frame, computing bit-error corrections, applying them, and output of a corrected FEC frame. The objective of a FEC decoding algorithm is to output the most likely correct frame of data given knowledge of the way the parity bits were generated. For FEC to work correctly, a particular FEC decoding scheme (parity bit use for error correction) must be matched to the FEC encoding scheme (parity bit generation).

Early success for FEC was achieved with Hamming, BCH, and Reed-Solomon codes. Further successes were obtained with convolutional codes, and serial concatenation of convolutional codes with other codes. On the decoding side the objective is to find the block of data that is most likely correct, given the received soft bits with noise-induced errors. This can be achieved in a single pass algorithm (Viterbi, etc.) or an iterated algorithm (Turbo, etc.).

FEC calculations involve comparing the probable correctness of the two choices for the value of a binary bit, depending on the observed sequence of values from the sampler. A sequence of fluctuating values may be treated as a random variable and so probability mathematics may be applied. The main interest is whether a particular transmitted data bit was a 1 or −1 given the values of the soft bits in the FEC frame. A large number of soft-decisions can be calculated before making a hard decision about the transmitted data. These soft decisions may be calculated by comparing probabilities and a popular way to do that and include the parity bits is to calculate a ratio of conditional probabilities referred to as a likelihood ratio (LR). The logarithm of the LR (LLR) is of particular interest because multiplications and divisions are transformed to additions and subtractions, which in a PE will calculate more quickly and are less prone to over- and under-flow. Consequently the FEC decoding can be computed with the values of LLRs stored in integers.

A log probability sum of products is also referred to as a MAX* operator. In various embodiments, the MAX* operator may perform in a similar fashion to an add-compare-select (ACS) with offset instruction. It provides for the sum of products type operations for log domain math on exponential probabilities. The symbolic form is often written: Max*(x0+y0, x1+y1).

In various embodiments, a PE implements such a function as:

$$Z[15:0]=MAX((X[15:0]+Y[15:0]),(X[31:16]+Y[31:16]))+TLUoffset$$

A double log probably sum of products instruction may be achieved by modifying the operand usage slightly to provide a higher throughput form that is useful for turbo operations. This one provides two results in a single datapath of the form Max*(x1+y0, x0+y1): Max*(x0+y0, x1+y1).

In various embodiments, a PE implements such a function as:

$$Z[31:16]=MAX((X[31:16]+Y[15:0]),(X[15:0]+Y[31:16]))+TLUoffset$$

$$Z[15:0]=MAX((X[15:0]+Y[15:0]),(X[31:16]+Y[31:16]))+TLUoffset$$

Another form of the MAX* operations where 32-bits are produced per datapath in the form of:

$$Max*(0,x1+y1)-Max*(x1,y1):Max*(0,x0+y0)-Max*(x0,y0)$$

In various embodiments, a PE implements such a function as:

$$Z[31:16]=MAX(0,(X[31:16]+Y[31:16]))+TLUoffset-(MAX(X[31:16],Y[31:16]))+TLUoffset)$$

$$Z[15:0]=MAX(0,(X[15:0]+Y[15:0]))+TLUoffset-(MAX(X[15:0],Y[15:0])+TLUoffset)$$

Another instruction may provide a double MAX* operation on two operands with the value in the two accumulators in each datapath. It provides a fast way to get the MAX* result on a large group of numbers by using the accumulator much like the MAXAC instructions do. The two 16-bit results go into the two accumulators. If using both datapaths then when the input data is completed the 4 accumulators need MAX* operations run on those values to get the final result. Symbolically, the equation appears as:

$$ACC_{n+1}=Max^*(ACC_{n+1},Max^*(x1,y1)):ACC_n=Max^*(ACC_n,Max^*(x0,y0))$$

A double of an accumulation form for the log probability sum of products may be achieved using:

$$ACC_{n+1}=Max^*(ACC_{n+1},x0+y0):ACC_n=Max^*(ACC_n,x1+y1)$$

It is noted that the natural result of the extra hardware for the LP instructions swaps the "0" index data to the high ACC and the "1" index data to the low ACC. If this can be easily swapped in the datapath, that will be preferable. In various embodiments, a PE implements such a function as:

$$ACC_{n+1}=MAX(ACC_{n+1},(X[15:0]+Y[15:0]))+TLUoffset$$

$$ACC_n=MAX(ACC_n,(X[31:16]+Y[31:16]))+TLUoffset$$

It is also possible to generate the double sum of quotients in the log domain. In a similar fashion as to what has previously been shown, subtraction is used instead of addition to provide:

$$ACC_{n+1}=Max^*(ACC_{n+1},x0-y0):ACC_n=Max^*(ACC_n,x1-y1)$$

In various embodiments, a PE implements such a function as:

$$ACC_{n+1}=MAX(ACC_{n+1},(X[15:0]-Y[15:0]))+TLUoffset$$

$$ACC_n=MAX(ACC_n,(X[31:16]-Y[31:16]))+TLUoffset$$

To implement the above-referenced instructions, dedicated logic circuits, such as those depicted in FIG. 9-FIG. 14 may be employed. In some cases, the logic circuits may be selectively enabled based on the type of instruction, thereby allowing multiple instructions to be performed using a minimum amount of logic circuits.

The primary interconnection network (PIN) of an MPS is designed for high bandwidth, low latency transport of data within and between applications running on PEs and communicating with chip I/O ports. An interconnection network (IN) may be generally described as a set of nodes with connecting links between them. Most PIN are not fully point-to-point capable in one stage as this would require too much wire. Instead they are multistage with a router at each node of the network and the nodes connected to each other by links. Messages can be routed through the PIN, which enforces rules for starting, pausing, and delivering messages from a source node to a destination node. If a message is left open then it may be used indefinitely as a data pipe. However, because of the multiple stages, an existing message can block the setup of a new message by occupying a link or destination that is specified by the new message, thus message delivery is not guaranteed. Some mitigations to this have appeared in the literature such as dynamic cut through, and long routes to "jump over" congestion. However, our approach is to add layers of interconnect, each layer having another set of links. With each additional layer, the PIN node router is expanded to allow messages to cross from one layer to another.

Figure 15:
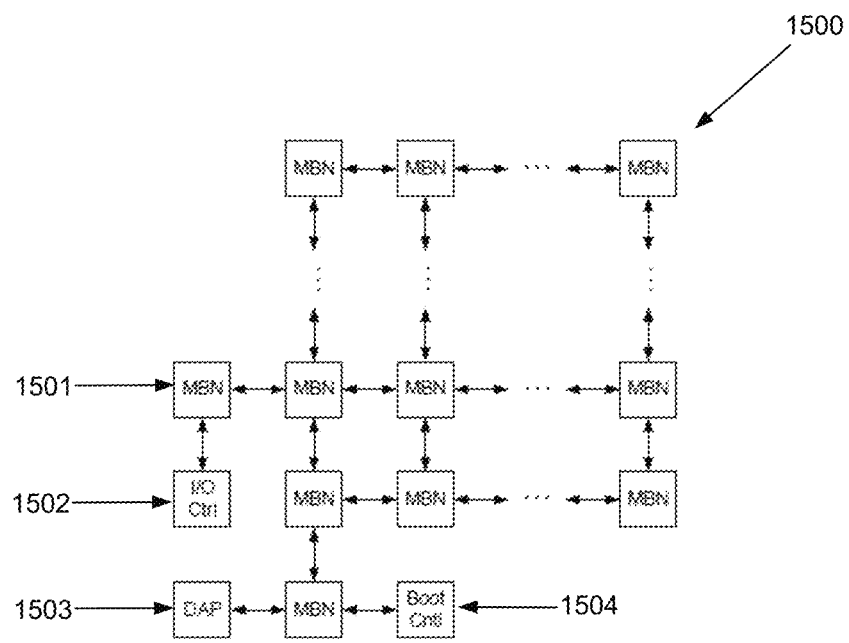
FIG. 15 depicts a logical overview of a message bus included in a multi-processor array.

In large MPS there is a need to manage the system without impacting the operational efficiency of the PIN. This has led to the development of secondary interconnection networks (SIN), which may, in some embodiments, have a lower bandwidth than a PIN but which may guarantee message delivery. Such an interconnection network is shown in FIG. 15. As illustrated, message bus 1500 includes multiple message bus nodes coupled to each other in a fixed connectivity fashion. The message bus provides a moderate bandwidth, variable latency, guaranteed delivery method of reaching every accessible register and memory location within the chip, including both PE and DMR locations, as well as I/O controllers, such as I/O controller 1502.

The message bus may be used to boot, debug, and load data outside of the core array fabric, as well as provide access to virtually all addressable locations through the MPS device. For example, the message bus may access, all PE/DMR data and instruction memory locations, internal PE registers, DMR registers (including register bus locations), and I/O peripherals attached to the I/O bus.

The message bus may, in some embodiments, provide support for multiple, simultaneous masters, such as, PEs, development access port (DAP) 1503, Boot Control 1504, and I/O processors. Messages are routed on the message bus using automatic routing based on relative positioning of source and destination. Replies route automatically in a similar manner to a request using relative locations. Error reply routes utilize a running location to the source maintained in the message.

In some embodiments, a message bus may comprise more than one independent message fabric. Occasions will arise where messages on independent fabrics attempt access to the same destination; for which automatic arbitration is useful. The arbitration outcome may be determined by a simple scheme such as priority configuration. A Message bus priority configuration may allow for two unique priorities, lowest or highest, established for access to a DMR address, with all PE address accesses at lowest priority in the PE.

A message bus may support multiple endpoint message groups to permit subsets of the array to respond to a single message. Multiple group memberships may be set on a single node. In various embodiments, a broadcast capability may be used to reach all nodes, and many independent groups may be available for allocation.

In various embodiments, the Message bus may allow for multiple chip operation. Relative address of destination may bridge between chips, if a multiple die structure is implemented. In some cases, the message format may permit up to 256 MBN nodes in the X and Y directions. In other embodiments, the message can be expanded to support additional nodes. By employing a relay technique using a table (e.g., table 1807), any suitable number of message nodes may be supported.

The Message bus has the capability to allow any processor within the device to reach every addressable location in the device. This capability enables a variety of possibilities, including the passing of messages between processors, updating tables of values as algorithms progress, managing the behavior of a remote I/O controller, collecting statistics on operations, managing security of a cell, and general communication of non-time-critical information between processors.

It is noted that the message bus may lack certain features that make it undesirable to be used as an extra layer of PIN routing fabric. First, the bandwidth is much lower. For example, in some implementations, the message bus may be as much as 10 times slower than the PIN, while in other implementations, the message bus may be only two times slower than the PIN. Second, the latency of data delivery varies widely, even for messages between the same source and destination pair. There is no concept of a programmed route setup and teardown, where in the fabric a known length route is set up for a message, and every time the route is used, the same wires are traversed to connect the two endpoints, resulting in a predictable latency for the data delivery. With the Message bus, relatively short messages are directed from a source to destination with the route determined by the fabric hardware. If a message is blocked at some point along the way, it will wait for the other blocking message to complete, then it will continue. With only one message at a time on the fabric (and no priority delays at the destination) data delivery by the message may show predictable latency. However, additional message traffic on the fabric may disrupt data delivery and may change the route taken by each subsequent message. Thus, the Message bus may be unsuited to distribute synchronized messages, as the arrival times are not guaranteed.

The Message bus is useful for power efficient, guaranteed delivery of lower bandwidth, short messages to/from any destination in the MPS. These would consume considerable resources in the PIN fabric, potentially tying up links for extended times with little data passing through, or requiring constant setup and teardown of links to prevent them from blocking the system. The Message bus also simplifies remote processor management of chip I/O, for MPS where only those processors near to an I/O port may control the port and any peripheral device attached to it.

While not well suited for timing critical applications, the message bus still has significant performance available. The bus itself moves a word per clock, and the clock may be the same as the functional core clock, which may have a target frequency of 1500 MHz. This results in an effective 1500 M word/sec movement rate between nodes. Since the message bus is designed to push data and addresses across the bus, then free the bus to other messages as quickly as possible, for each word delivered to a register, there is an inherent overhead required to define a route, identify where words should read or written from, and how data or status is returned to the node making the request. These non-data words reduce the throughput of the bus for a single transaction. To limit the impact of the overhead of the message structure, an arbitrary number of words can be transferred in one message, with the only limitation being they must be contiguous from a single starting address.

Under normal conditions, access to any normally addressable location within the MPS device is available. This means any register, memory location, or peripheral that has a normal mode address can be written or read, within the parameters of the specific address being accessed. For some PE internal registers the contents of the PE can be read while the PE is operational, however, the values contained represent a snapshot in time when the read occurred, and only update when the value is requested. In addition, there is a time interval between when a request is generated, the value is read by the message bus from the PE or DMR, and the results are delivered back to the requester, which depending on system and message bus loading may represent a significant waiting time for a result. There is the potential for excessive waiting for access to certain PE internal registers that are needed for operations on nearly every clock, effectively stalling the request until the PE is stopped at a breakpoint. It is possible that a gap would appear in the code allowing these registers to be read, but the PE requires a number of registers to operate, and a Message bus message attempt to read those registers at the default low priority will generally result in a prolonged stall of the message. Within the DMR the priority of access is programmable, so the request can be made to either wait until no other requests are pending for that address region, or immediately access the address, and block all others attempting access to the same region.

The normal mode address locations may include:
Read/Write access to any DMR data memory location
Read/Write access to any DMR memory mapped register
Read/Write access to any PE instruction memory location
Read/Write access to PE status and control registers
Read/Write access to clock control registers
Breakpoint control, except Hardware Break insertion
PE wakeup control
Parity control
PE message passing
PE programmer register access
Memory and Peripherals on the IO Bus Extreme care must be used when operating on instruction memory while a program is executing. It is possible to write a block of instructions to memory, and due to execution of a currently running program, a portion of the new code may be executed, without first completely replacing the block of code, resulting in unpredictable operation. An MPS may be configurable to include parity bits on each write to memory and to check parity on every read operation, branching to a fault condition if an error is detected. However, parity checking consumes more power than when not doing so. Parity check in an MPS may be considered a mode of operation to be used in extreme environments, meaning that with and without parity are distinct operating modes of a memory, and changing between these modes is not advisable while running applications that use that memory.

Access to the clock control is possible under all conditions, however, not all times are advisable to alter the state of the clock registers. While the system is operational, especially when operating on data sets that are shared between multiple processors, changes to the clock control will be made locally without regard to other nodes which may also be accessed to update the clock control in those locations. Timing of access to data will likely be lost if attempting to alter the clock configuration while an algorithm is running.

When a PE is stopped at a breakpoint, additional access is available to the message bus. As the PE is suspended, the program counter has stopped, and updates to hardware breakpoints are possible. All of the normal mode capabilities are available, with a hardware breakpoint insertion capability additionally available.

Due to the implementation of breakpoints, changing values while the system is in operation can lead to unpredictable results including missed breaks, and unintentional breaks. Thus, changes to the breakpoints will most reliably become effective while program execution is stopped.

As the PE is stopped at a breakpoint, internal register access time will be improved, and the returned values will remain accurate for the stopped processor. The arbitration for PE register access, while not altered, has no active higher priority requestors, enabling faster access by the debug system to the PE internal state registers. Similarly, on the DMR, after DMA operations complete, there are no other competing accesses for addresses, and even lowest priority requests are served immediately.

During boot, the message bus may be utilized to load the processor for the first time, configure clocks and security, and release the PE from reset to start operations. For boot operations, it is expected that the majority of transactions on the message bus will originate from the boot processor, with destinations throughout the device. It is expected long burst operations will be prevalent, reducing the overhead of program loading due to addresses.

One later use of the boot controller is to implement dynamic cells, where it is possible to have new cells loaded into an already running system. As used and defined herein, a cell is a portion of an application assigned to one or more PE and one or more DMR. It is noted that at least one DMR is included in a cell to serve as an instruction memory for a related PE included in the cell. In this case, there is likely more activity on the message bus, but again, already being at the perimeter of the device, arbitration is simplified to transmit new cells into the array. By utilizing larger block transfers, the time to load dynamic cells can be minimized. Unlike the initial loading, there will likely be contention at some point while the replacement cell is loaded. The overall length of a burst should be considered when implementing dynamic cell loading, as it will consume a path for potentially a long time, and may lead to delays in delivery of other messages.

One common problem with an in-system debugger is the potential interaction of the debug facility with the functional operation of the system. In certain cases, it may result in a change in behavior of the functional system when debugging is engaged, or more problematic, correcting or changing the error when debug is operating. While any access that must be arbitrated can never completely remove the interaction between functional systems and parallel debug facilities, if debug operations are mapped into a separate message bus instance this can remove all interaction except the final data access arbitration. Through careful selection of debug to be the lowest priority, debug would only interact with the system while it is otherwise unused, and would not upset the functional accesses generated from the functional system. In various embodiments, the priority may be changed between low and high.

When a processor is at a breakpoint, there are no PE originated requests delivered to the DMR. This does not mean that there are no requests present in the DMR, as DMA requests can continue to be processed while the PE is stopped. This results in a split state, where PE requests are served immediately, as no other requests for data would be present, and a DMR state where DMA transactions would continue to be ahead of debug requests. Logically, this maintains the idea that debug should not interfere with operations, and for non-breakpoint processors.

Before diving into the details of the bus itself, it is helpful to first understand what is meant by a message in the context of the message bus. In the most general sense, the message needs a means to deliver the message to the intended destination, the data to deliver, and a means to get a response back to the starting point. In detail, there are several uniquely different messages that the Message bus passes through its network, which will now be covered.

Messages are constructed and sent by programming the configuration registers within the Message bus node. There are two sets of these registers for the two channels (A and B) of the Message bus. The programming of these registers is discussed below. There are several formats of messages available. These can be categorized as follows:

Point-to-Point Message—Allows one to read or write information from any other single node.

Multi-Point Message—Allows reads or writes to a group of end point nodes with a single message.

Reply Message—Not directly generated by a user. Used by the message bus to provide acknowledgement of the other messages.

Secure Configuration Message— A form of message used to configure security for the chip.

To send a message the program must program the basic components of the message into configuration registers and then signal for the message to be sent. Programming components are listed in FIG. 16

The STATUS register is used to observe the status of the message that was sent. In addition to these registers that directly control the messages being sent there are several other configuration registers described later that are used to control other aspects of the message bus system. Note that only the registers that need to be modified to define a new message need to be updated prior to sending the next message. For instance, to send the same message to five locations simply update the route information in DELTA_OFFSET and resend the message using GEN MSG. The message formats will be described more fully below.

The most basic message, which can be used by any master to reach any location in the chip is the Point-to-Point message. As the name implies, this message targets a single location, and issued from a single location. The information passed between the two nodes is only seen outside the message bus by the two nodes, as all intermediate locations have no means to snoop the passing data, in this regard, all Point-to-Point messages are secure. A variety of options are available for constructing the message, which balances capabilities and overhead for this message type.

The slave can only receive and process one message at a time, so there is no need to know which node is requesting the data accesses, only a route back to the master is necessary, so that the reply can get through. Part of the request message includes the return path for the response, which is necessary to complete the round trip of the Point-to-Point message.

The Point-to-Point message can be either a read or write request, with the read request generating a reply message containing the requested read data, and a write request generating a response indicating the success or failure of performing the write. Much like the read or write request message balances capability and performance, the reply message also minimizes overhead, at the expense of some lost flexibility at the master.

There is one reply message to each Point-to-Point read or write message, and in the case of multiple data words included, there will be multiple reply words included, so that every address sent out, has a reply returned, either status of a write, or data for a read. The data in the message body will be returned in the same order as the request sent. To ensure that the data is promptly removed from the bus when arriving back at the requesting node, the address of where to store off the response is programmed in the MBN. Since only one reply location can be stored at a time, each MBN can have one outstanding transaction at a time if more than 1 word is expected in return, and the automatic memory loading mechanism is used. If the processor extracts all the data from the node, then as many requests can be outstanding as the processor desires.

The same reply message format is used for all multiple endpoint replies, however, for these multiple endpoint replies, a single reply word is inserted into the payload. For example, in read messages, the value of the requested address, or the security error control word if an invalid read is attempted to a secured region. Alternatively, in write messages, the reply may include a pass or fail value indicating whether the request write was performed or not.

The multiple endpoint write message is received by more than one active nodes. This message is useful for communication within a cell, where the cell can be instructed which messages to react to through the message bus configuration address write. Security may prevent writes from occurring, and a single write status is returned for the entire message, rather than individual word status, as this would potentially cause blockages. The reply address is recorded as the delta offset from the requesting node, computed as the multi-cast message is distributed through the array. This will result in many paths being used for returning the reply message back to the master, many not following the same path as the request, which is expected. A case of the multiple endpoint message is the broadcast message, which addresses all nodes at once.

There may also be times when the ability to read the same address from a collection of message bus nodes is useful. For these cases, the use of a multiple endpoint read is available. The operation functions such that only nodes that match the multi-node address will respond. As with the other multiple endpoint messages, the reply path is determined by delta offset computed on the way to the replying node. The replies will follow a number of routes back to the requesting node, many of which are different from the path taken from the source to the destination. There is also a case where all nodes will respond, and return one word.

At each node, a security configuration is maintained, which describes the operations that are allowed at the node. Setting this configuration must be a secured action, and is implemented through an TO processor selected as a part of the boot operation. This message is used to update the security configuration, and can be generated by a selected processor in the system. The format of this message is unique, and cannot be constructed through data writes, thus only identified security processors can generate this message. The underlying security decisions that lead to generation of security configuration messages is out of scope for the message bus, as the only consideration is the delivery of the messages. The nodes not selected to be the security master are disabled from sending security messages much like masters can be disabled to implement a forced separation of debug from functional networks, although in this case only a type of message is restricted rather than all message generation as is the case in network isolation.

The message bus may be implemented as a two-dimensional mesh network as shown in FIG. 15. In addition, there are two identical networks operating in parallel, with a recombination point located within each node. Each link shown is comprised of both an input and output port, duplicated for both networks, both networks allowing simultaneous transmit and receive on the same side of the node, for a total of up to four messages active on any side of the node. In the maximal use case of one of the networks, all four input ports and four output ports can be utilized to transport messages across the node. When in maximal use case operation, the only restriction on routing is that no U-turn routes are permitted, but any other combination of routes to the other three outputs is acceptable. While there are two networks present at every node, they operate completely independent of each other, with no routing possible between the two networks, making it possible to have blocking occur in one network while the other is idle.

There are several advantages to the implementation as a mesh network over other topologies, the largest being the ability to route around obstacles. Since the message bus is a dynamically routed network between nodes, there is always the potential to encounter blockages on a direct path between the two nodes, from routes already in use by other messages, to nodes being powered off to reduce overall chip power consumption. The mesh structure provides options for reaching the destination, in most cases there are two logical directions which move the message closer to the endpoint, meaning that even if one direction to get closer to the end is blocked, another generally exists. It is still possible to have un-routable messages, but this is due to the complete lack of a path between the requested endpoints, such as one located in a power-down region, which is a failure of the system, not necessarily a failure to route a message.

Another advantage to the mesh network is a reduction in message travel distance. For large numbers of nodes there are several potential connection methods, serial chain, multiple loops, row or column-oriented bus, and a mesh. In the serial chain, the main drawback is the long distances that the message may have to travel between the two points. Additionally, the number of messages that can coexist in the network is generally reduced, as there is typically only one path available through the chip. Serial chain access timing may be variable and difficult to design for adequate timing margins.

Another issue with large serial chains is power, and the inability to power an arbitrary region down if any of the nodes are part of a path needed to access an unrelated node. An improvement to the single serial bus is a number of smaller loops, but this leads to the centralized problem of needing to move between loops, and the potential for significant delay if conflicts occur at the inter-loop connection point. The multiple loops also continue to have issues with power optimization, as an entire loop would need to be either powered up or down, which results in a fairly large power step. The number of simultaneous accesses increases, but is still limited at the point data must move between independent loops.

A multi-bus oriented arrangement has similar issues like the multiple loop construction, namely the point needed to move between the various bus segments ultimately becomes a choke point for the overall interconnection network. The bus arrangement does permit an easier means to send multiple messages at one time, however, the ease of getting a message on one bus segment is reduced by the complexity of needing to arbitrate between different bus segments. Depending on the location of the inter bus interconnect, this may force a certain region of the device to remain on, for no other reason than to be able to move data between bus segments. With I/O spread around the perimeter of the device, there is no ideal location to place the inter bus connector, as data could potentially have affinity to any side of the device. This results in some layouts being relatively power efficient, while leaving others as poor performers due to needing a large number of otherwise unused nodes on to be able to interconnect with other bus segments.

The mesh also supports many messages running in parallel. As there is no common choke point to the routes, many messages can move through the network at the same time. Unless through significant blockages routes are constrained to merge and pass through a single node in the same direction, each message can progress often without ever encountering another message, regardless of when the message is sent. If each processor supports one message at a time, the upper limit for concurrent long-duration messages is equal to the number of processors in the system. Congestion may, however, reduce the practical upper limit, depending on the routes needed to deliver the parallel messages, and return the replies to the messages.

Figure 17:
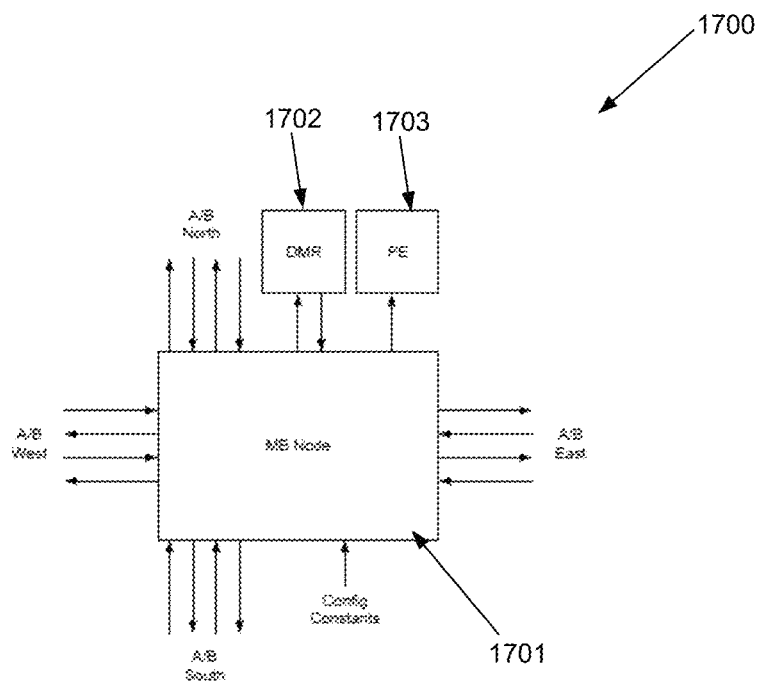
FIG. 17 is a block diagram depicting a general interface of a message bus node.

As all nodes within the message bus structure function either as a master, a slave, or an intermediate point of a route, these basic functions of each node will be detailed in general in this section. The exact interface details may vary across embodiments, with this description providing a functional overview of the message bus node components. The general interface of the message bus node into the system is illustrated in FIG. 17. There is a variation in how the node is attached at the IO Bus, as there is no PE link required, although the underlying operation is similar.

As illustrated, message bus node 1701 is configured to receive a first message that includes a payload and routing information, select a different message node of the plurality of message nodes based on the routing information and operational information of the multi-processor array. As used herein, operational information is information relating to either past or current performance of a multi-processor array. For example, operational information may include resource availability, network performance heuristics, congestion information for the message bus, and the like. In some cases, the operational information may be current information about the performance of the multi-processor array, while in other cases, the operational information may include a historic information regarding the performance of the multi-processor array. It is noted that in some embodiments, a message bus node may receive the operational information from the multi-processor array during operation.

Message bus node 1701 is further configured to modify, based on the different message node, the routing information of the first message to generate a second message, and forward the second message to the different message node. Routing information, as used herein, is information that specifies either an absolute or relative destination for a message. When a relative destination is specified, a number of nodes and respective directions are specified from the starting node in order to determine the destination for the message. Alternatively, when an absolute destination is specified, an identifier noting a particular node is specified as the destination. Each message node may then determine a best possible node to forward the message in order to propagate the message to the specified absolute destination. As described below in more detail, routing information can include an offset which specifies a number of messages nodes and in what direction the message is to be sent.

As used and described herein, a message is a collection of data that includes a payload (i.e., the content of the message), along with routing information. Additionally, the message can include the operational information or any suitable portion of the operational information.

Figure 18:
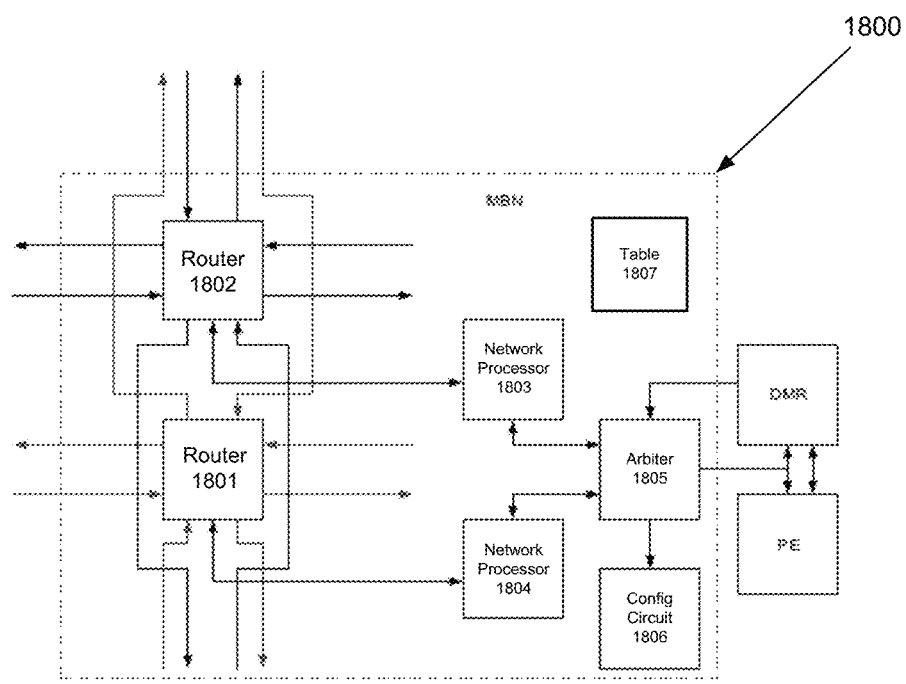
FIG. 18 is a block diagram illustrating internal components of a message bus node.

Message bus nodes (or simply "message nodes") may be implemented according to various design styles. A particular embodiment is depicted in FIG. 18. As illustrated, message bus node 1800 includes router 1801, router 1802, network processor 1803, network processor 1804, arbiter 1805, config circuit 1806, and table 1807.

Message bus node 1800 is attached to the PE and DMR through the arbiter 1805, and in the case of the IO Bus, the arbiter 1805 is the bridge between the IO Bus and the message bus. There are three targets of an access entering message bus node 1800 from the local processor, the configuration registers (located in config circuit 1806), and the network processors 1803 and 1804. In addition, network processors 1803 and 1804 can be generating accesses to the local node, and only one access path is possible from message bus node 1800 back to the DMR or PE. Based on the configuration of the node, which type of access, a remote request processing, a local request being generated, or a reply being stored, the arbiter 1805 connects one of network processors 1803 and 1804 to the PE and DMR interface.

Since only the request generation is vulnerable to stalling from the network side, all writes to the DMR or PE can be generated immediately. In the case where a read is requested, either to fill data for a write request, or in response to a remote access being processed, arbiter 1805 must wait for one request to complete before switching to the other network processor. If the DMR or PE has stalled the request, it is possible to remove the current request and switch to the other network processor if that access is configured to be higher priority. Since the PE or DMR had already stalled the access, there is no data in flight that would be impacted by switching the access to the other processor.

Arbiter 1805 is also configured to steer the register bus traffic to the proper network processor or configuration registers, based on the address requested. Arbiter 1805 will also generate stalls back on the register bus interface in the case that a remote access is currently using the configuration registers, as this is the only point of contention in message bus node 1800 between the local node and remote accesses.

Network Processors 1804 and 1805 are responsible for the interaction between the attached PE/DMR or IO Bus and the rest of the message bus network. There are three responsibilities that network processor 1803 and 1804 fulfill, the first being generating request messages into the network. The second function is to process messages received from the network (including modifying the routing information of a message), and access the local addresses requested in the message, either for writes or reads. The last function is to process the reply messages received in response to a request message.

The first function of a network processor (e.g., network processor 1803) is to generate new messages into the network. This is accomplished in one of two ways, the first, for single word messages the PE can write the node delta to the remote node or multiple endpoint group to access, the address at the remote node to access, and in the case of a write, the write data. The network processor then generates the message structure, and sends the message to the router for delivery. For longer messages, meaning two or more words long, the PE writes the node delta to the remote node, the starting address at the remote node, the end address at the remote node, and the local address in the DMR where the write data can be found, or in the case of a read, the location that the returned data will be stored. Once these values are configured, the network processor generates the message structure to the router, and generates read requests to the DMR to fetch the necessary write data.

The second function of a network processor is to service the messages received from the network, and provide a response. In this case, the arriving message structure is deconstructed, and the first and last addresses to access are stored off. In the case of reads, a read request will be generated to the DMR, starting at the first address, and continuing until the last address is reached. A check that the region being accesses is not protected by security is performed, and an error value is returned instead of data for read words, which are not accessible in the present configuration. In the case of a write, the network processor will wait until the first data word arrives, and then it will generate a write to the DMR for each word received. Writes have an additional check performed to validate that if the address is a security configuration address, the received message is also a security message type.

The third function of a network processor is to receive the replies to requests, and store them back for the processor to read. This step has two options, the first is for single word replies, which the processor can directly read from the reply register of message bus node 1800. To prevent multiple word messages from stalling in the network, when more than one word is returned, the network processor will store them back to the DMR memory. When the read request was generated, the reply storing address range was also configured in message bus node 1800. The network processor uses the pre-programmed address range to store back the reply, discarding any additional data that may have been returned in the message as a safety measure.

As there are three functions competing for a single resource, the network processor must also determine which action to take at any given time. In reality only two of the three can be present at the same time, as only a reply or a request service can be active on the router side of the network processor, and a request generation can be active on the PE/DMR side. The main issue with arbitration is ensuring no deadlock condition can form, and the prevention of deadlock is more important than the performance of the system under deadlock potential operation. Since the system can plan how the messages will flow in the system, the arbitration scheme is selected from one of three options. The first scheme is first in, first served. In this mode the node will process the first request, either from the network or processor side that arrives, and process that message to completion before considering any other messages. This is the simplest method that maintains full network performance, however, it is vulnerable to deadlock. The second method is round robin servicing, which will alternate between the two requests for access. Unfortunately, due to the pipeline depth of the DMR interface, this has the potential to cut the access rate to $\frac{2}{5}_{th}$ speed. What effectively happens is a write for the return or a remote read or write will occupy one cycle, the next cycle will handle a local write message read of the write data, then the interface must wait for these two accesses to complete. By waiting, the network stall interacting with the DMR pipeline is avoided, at the expense of significantly lower performance. Between these two is a means to determine that the message entering the MBN and the message leaving the MBN are not both between the same nodes. While multi-node deadlock is possible, the system must actively create such a scenario, which the hardware will not protect against. By checking from where the data came, and comparing to where the data is going to, it is possible to determine if the two messages that are competing could generate deadlock, and in such a scenario the round robin operation can be selected. Otherwise, FIFS can be the default, running at full speed, and as a system wide message delivery, the messages complete sooner than if round robin is implemented.

Each of router 1801 and router 1802 are coupled to respective network and are configured to receive messages from the network, and forward messages generated by network processors 1803 and 1804 onto the messages respective next destinations. Routers 1801 and 1802 may include multiple switches or other suitable circuits configured to coupled network processors 1803 and 1804 to their respective networks.

Routers 1801 and 1802 are identical, and each performs two main operations on data passing through the node. The first is to identify those messages that are intended for the node. This involves looking at the two bytes of node delta address delivered, and upon finding a set of zero values, starting to extract the following contents of the message and delivering them to the slave processor.

When a match is not found, the second main operation is to forward messages on to the next node, making progress towards the destination. Progress towards the destination can be in potentially two directions, with an option to detour in the third direction if there is no available path along the two options that lead closer to the destination. The direction the data arrived from is not an option, as backtracking is not allowed, an underlying requirement of the system design is to allow a path between the two nodes that are to communicate such that a route does not need to make a U turn when following the routing rules.

The router is also responsible for inserting new messages into the network. To insert a message into the network, the destination delta offset is known, and so long as one of the two logical direction outputs towards the destination is free, the message is accepted and placed into the message bus. Just prior to the first address and data pair the reply delta slot is inserted in the message, to permit the destination node to reply back with the result of the requested operation. The reply delta is automatically updated based on the path the message takes through the network, allowing any node along the way, in the case of error replies, or the destination node to have an accurate destination to send a reply to in response to the request message.

Figure 19:
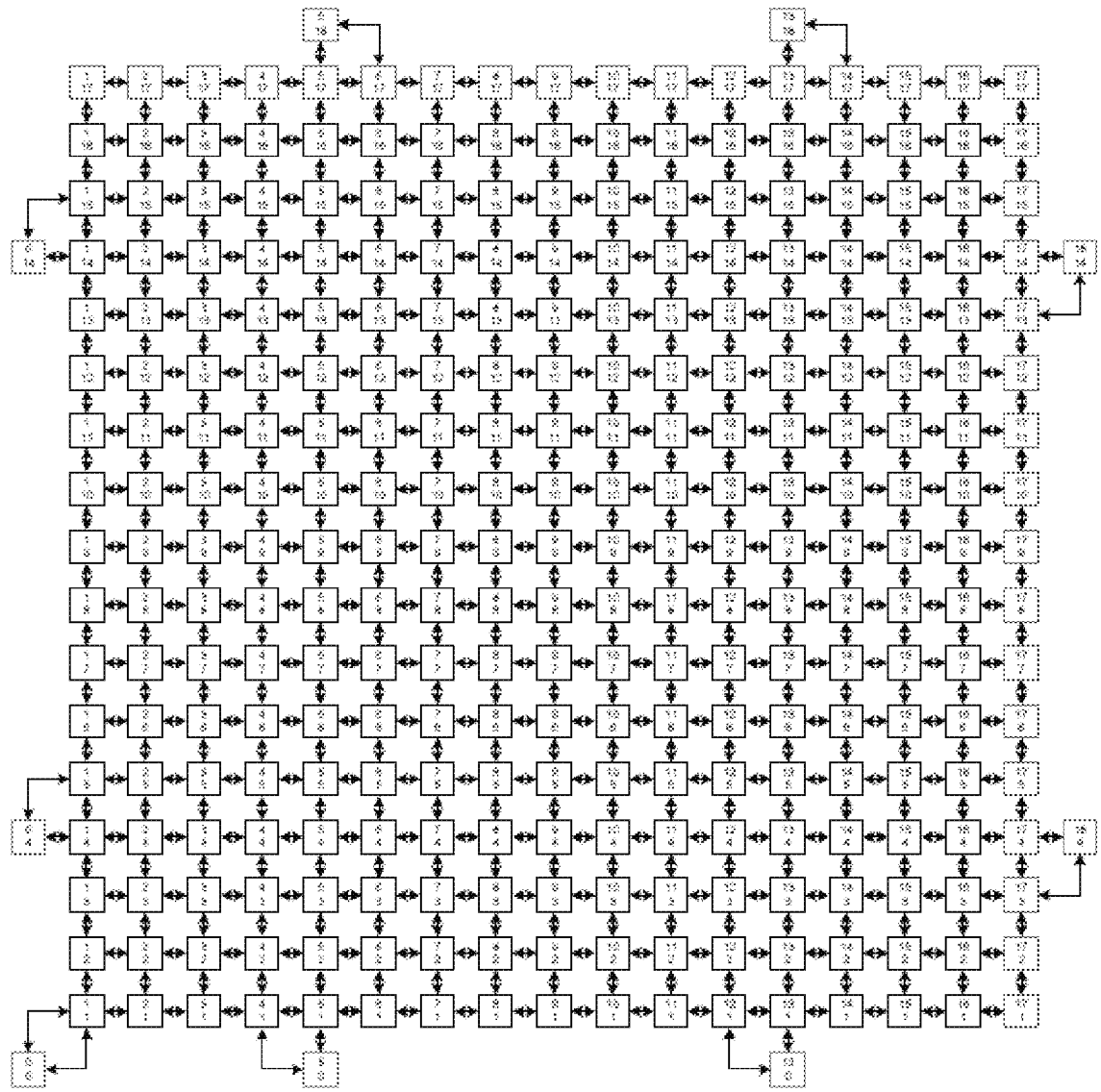
FIG. 19 is a block diagram illustrating an embodiment of a message bus network.

When discussing addresses within the message bus, it is important to differentiate between the address of the message bus node, and the value placed in the message in order to route to that node. The address of the node is effectively the X, Y coordinate location of the node within the overall array, which includes IO nodes, core array locations containing a PE and DMR, and core nodes containing only a DMR, as occurs on the top and right edges of the array. Location (0,0) is found on the lower left corner of the device, connected to the boot processor, located outside the main core array. The core array is bounded by these four corners (1,1), (1,17), (17,17), and (17,1) as shown on the overall array in FIG. 19 noting that the format in the figure is (top number, bottom number).

The location address of the message bus node is used in generating the routing delta information for use in the message header. To compute the routing delta necessary for the message, the signed difference in the two locations is used to identify the number of nodes that need to be traversed in each direction of the mesh to transit from the source to the destination node. For instance, to travel from (2,2) to (4,7) a delta address of (+2, +5) would be used, and the return route would be (−2, −5). This indicates that the destination is 2 nodes east and 5 nodes north of the current location. This permits a flexible placement of cells, since routing information is relative, and if a cell is moved, the endpoint is moved a similar distance, leaving the delta between the two locations unchanged.

In some cases, information stored in table 1807 may be used to determine the routing delta. For example, destination information included in a message may be used as an index to table 1807 to retrieve data. Such data may specify a next message bus node to which the message should be forwarded. Table 1807 may be implemented as a static random-access memory (SRAM), register file, or other suitable storage circuit. In various embodiment, the information stored in table 1807 may be loaded during a boot sequence and may be updated during operation of the multi-processor array.

Given an 8-bit row and column address value, it may be possible for the message bus to span a 256×256 node array. To realized such a node array, and allow for the message bus to remain constant, scale as technology nodes shrink, or support multiple die array construction may occur in later generations, a format of the address may be selected that would not need revision for a number of generations.

Once a message has reached the destination node, a second address needed to locate the value at the destination node to access. Unlike the row and column addresses which have ample room for growth, the PE/DMR destination node local address component is actually rather tight on space. As currently defined, there are 16 k words of DMR data memory, 8 k words of PE instruction memory, a DMR register bus space, PE internal registers, and the message bus internal configuration registers. Since the local address does not need all 16 bits of a word, and the read write indication requires only one bit, the bit 15 location is utilized as a control bit. This is also convenient since the address is repeated for each burst to be written or read, and allowing the burst by burst selection of read and write provides a flexible and efficient means to apply control to the access.

For the IO bus interface nodes, the bus operates with a 32-bit address. Based on the message format, only 15 bits transfer for each burst, resulting in 17 bits unaccounted for by the message. For these remaining bits, a page register is used, with an implied upper bit of 0, resulting in a potential 31 bits of address available, more than enough for the IO Bus to place all necessary memory and peripheral spaces. As a part of messages that access the IO Bus, the message should start with a write to the page register, as the page will hold the last value written, leading to potentially unintended access locations if another master has set the page register to a different value than the current master was expecting.

Figure 22:
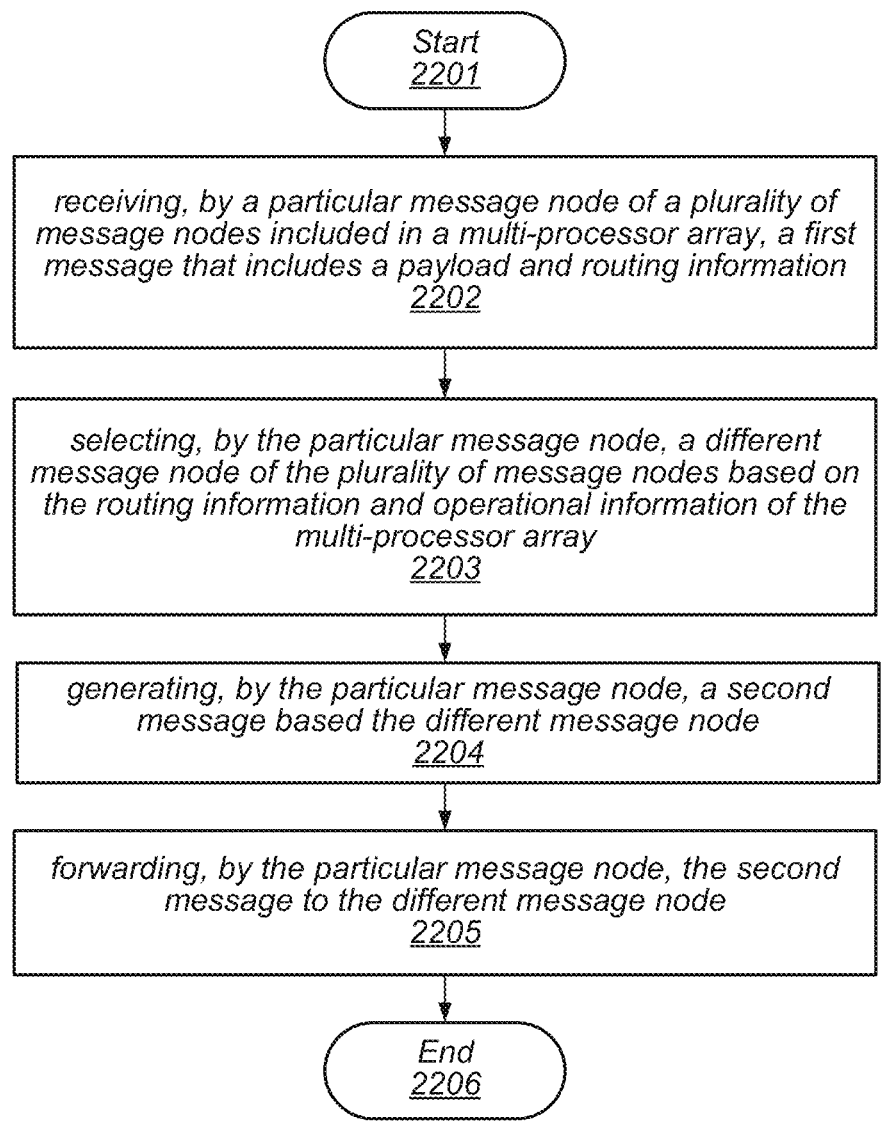
FIG. 22 depicts a flow diagram that illustrates an embodiment of a method for operating a message node.

To further illustrate the operation of a message bus node, a flow diagram depicting an embodiment of a method for operating a message bus node is illustrated in FIG. 22. The method, which may be applied to message bus node 1800 or any other suitable message bus node, begins in block 2201.

The method includes receiving, by a particular message node of a plurality of message nodes included in a multi-processor array, a first message that includes a payload and routing information (block 2202). As described above, the first message may be received via one of multiple message busses coupled to the particular message node.

The method also includes selecting, by the particular message node, a different message node of the plurality of message nodes based on the routing information and operational information of the multi-processor array (block 2203). As noted above, the different message node may be based on a relative offset included in the routing information and congestion or other heuristics included in the operational information.

Additionally, the method includes generating, by the particular message node, a second message based the different message node (block 2204). In various embodiments, a network processor (e.g., network processor 1803) may generate a second message based on which message node was selected. In some cases, the second message may include modified routing information that can be used by the different message node to forward the message onto a subsequent message node.

The method further includes forwarding, by the particular message node, the second message to the different message node (block 2205). In some embodiments, a router (e.g., router 1801) may forward the second message based on a relative offset included in the routing information of the first message. Such a relative offset can be used by the router to determine in which direction the message should be sent. The method concludes in block 2206.

HyperOp Datapaths

Figure 20:
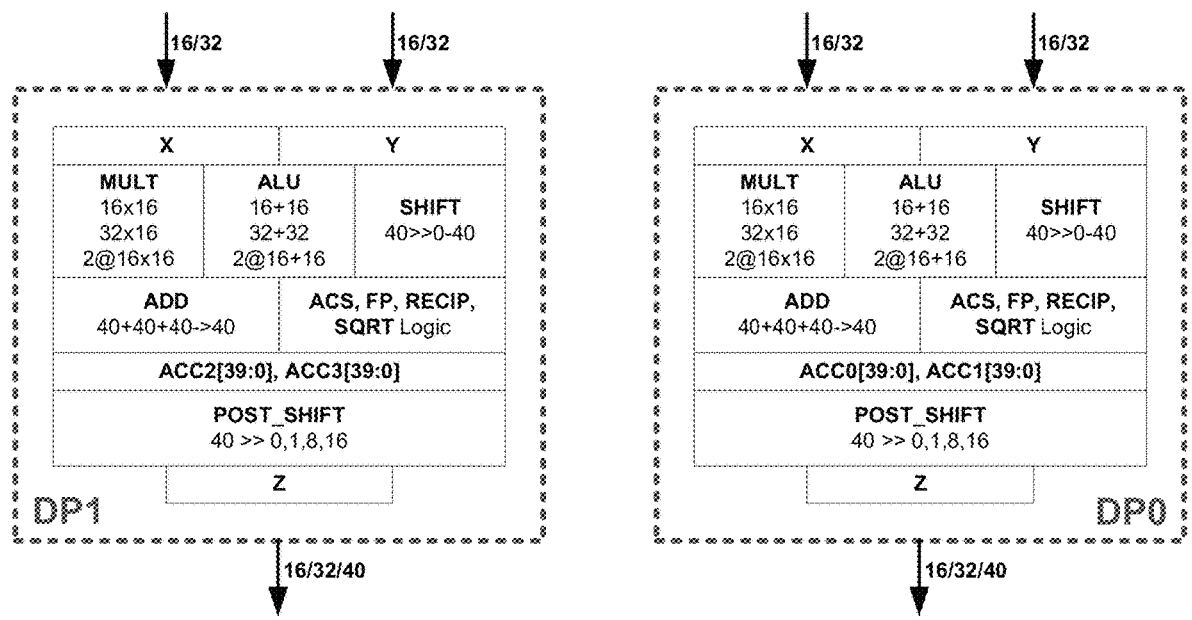
FIG. 20 is a block diagram depicting a HyperOp datapath.

Turning to FIG. 20, an embodiment of a HyperOp datapath. As illustrated, the HyperOp datapath includes two datapaths identified as DP0 and DP1. Each of DP0 and DP1 may be identical and include multiplier circuits, adder circuits, shifter circuits, as well as additional circuits for moving operands through the datapath. It is noted that a given PE in a multi-processor array may include the HyperOp datapath depicted in FIG. 20.

Figure 21:
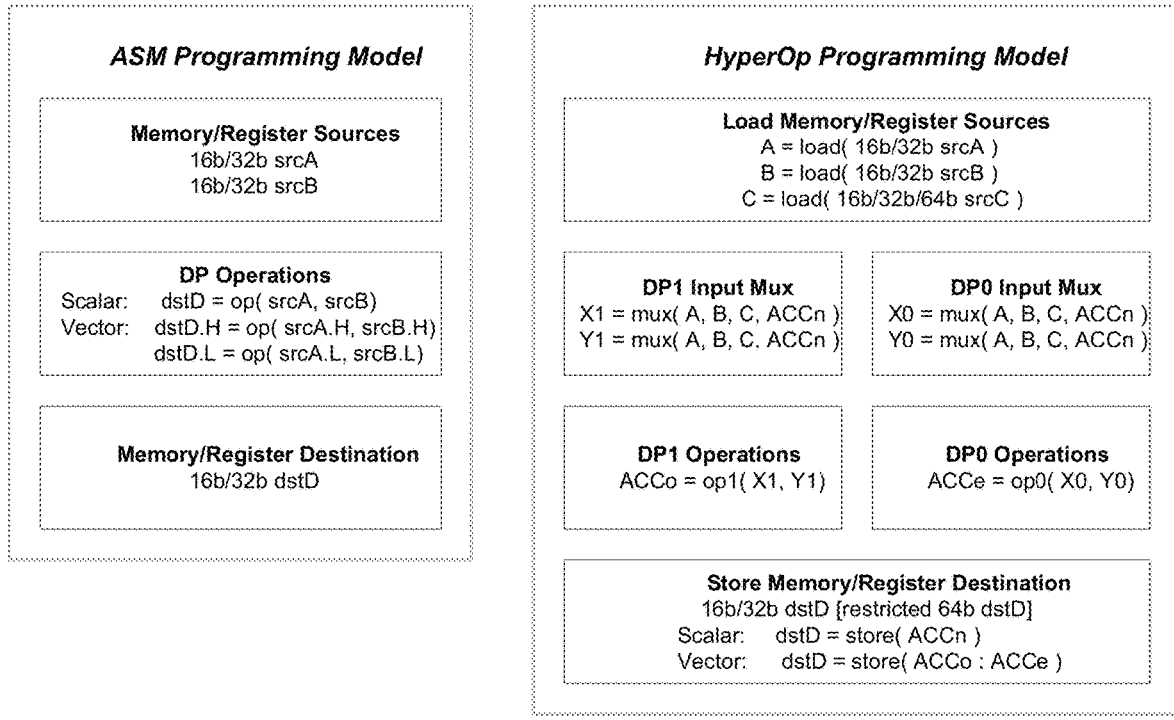
FIG. 21 is a block diagram depicting programming models.

Different programming models may be employed with the multi-processor architecture described above. Examples of such programming models are depicted in FIG. 21. As illustrated, FIG. 21 includes an ASM and a HyperOp programming model. Additional details and coding examples for the different programming models are described below. Each example includes:

C—reference code describing the functional operations/algorithm.

ASM—one or more examples of how to implement the operations/algorithm using 64b instructions. It also includes examples of using vector intrinsics (pseudo ASM instructions) to access dual-DP. The vector intrinsics are ASM-like instructions that are mapped to HyperOps instructions HyperOps—one or more examples of how to implement the operations/algorithm using 128b instructions.

Memory Operands

ASM Code

| | | | |
|---|---|---|---|
| add16s | M1.H, | M2.H, | M3.H |
| add16s | M1.L, | M2.L, | M3.L |

HyperOps Code

| | |
|---|---|
| \|A\| | ld32 M1, %A; // load SIMD data from 32b M1 |
| \|B\| | ld32 M2, %B; // load SIMD data 32b M2 |
| \|DP1\| | add16s %AH, %BH, %ACC2; // ACC2 = M1[0] + M2[0] |
| \|DP0\| | add16s %AL, %BL, %ACC0; // ACC0 = M1[1] + M2[1] |
| \|D\| | dst16 %ACC2_ACC0, M3; // store SIMD result to 32b M3 |

Immediate Operands

ASM Code sub16 s % r2, $10, % r8

HyperOps Code

| | |
|---|---|
| { | |
| \|A\| | ld16 %r2, %AL; // load 16b R2 |
| \|C\| | ld16 $10, %CLH; // load 16b immed value 10 |
| \|DP1\| | sub16s %AL, %CLH, %D1; // D1 = R2 − 10 |
| \|D\| | st16 %D1, %r8; // store result to 16b R8 |
| } | |

Note the load immed uses slotC to load a 16b segment of the % C register, but it could use slotB to load a 16b segment of the % B register.

Conditional Execution on Scalars
C Code

```
int16 a, b, c, d, e;
if (a > b)
  e = c + d;
```

ASM Code

```
// Assume:
// a in %R2
// b in %R3
// c in %R4
// // d in %R5
// e in %R6
// %R7 used as temp
tcmp16s GT %R2, %R3, %P0
add16s %R4, %R5, %R7
cmov16 (%P0) %R7, %R6
```

HyperOps Code (Conditional Store Slot)—Version 1

```
{
|A|    ld16s %R2, %AL; // load 16b R2
|B|    ld16s %R3, %BL; // load 16b R3
|DP0|  tcmp16s GT %AL, %BL, %P0; // test (R2 > R3) and set pred P0
}
{
|A|    ld16s %R4, %AH; // load 16b R4
|B|    ld16s %R5, %BH; // load 16b R5
|DP0|  add16s %AH, %BH, %D0; // D0 = R4 + R5
|D|    st16 (%P0) %D0, %R6; // if(P0) store result to 16b R6
}
```

HyperOps Code (Conditional Store Slot)—Version 2

```
{
|A|    ld32 %R2.d, %A; // load 32b R2:R3
|B|    ld32 %R4.d, %B; // load 32b R4:R5
|DP1|  tcmp16s GT %AH, %AL, %P0; // test R2>R3 and set pred P0
|DP0|  add16s GT %BH, %BL, %D0; // D0 = R4 + R5
}
{
|D|    st16 (%P0) D0, %R6; // if(P0) store result to 16b R6
}
```

Notes:
conditional execution in ASM model only available with CMOV
  requires computing result to temp register, then conditionally moving to destination
conditional execution in HyperOps model allows condition to be applied independently to slots
predicated execution uses predicate flags Pn set in earlier instructions, not the same instruction
  conditional store is in slotD of separate instruction
  it may be possible to hide it in a subsequent HyperOp

Conditional Execution on Vectors
C Code

```
int16 a[2], b[2], c[2], d[2], e[2];
if (a[0] > b[0])
  e[0] = c[0] + d[0];
if (a[1] > b[1])
  e[1] = c[1] + d[1];
```

ASM Code

```
// Assume:
// a[0],a[1] in %R2,%R3
// b[0],b[1] in %R4,%R5
// c[0],c[1] in %R6,%R7
// d[0],d[1] in %R8,%R9
// e[0],e[1] in %R10,%R11
// %R12,%R13 used as temps
tcmp16s GT %R2, %R4, %P1
tcmp16s GT %R3, %R5, %P0
add16s %R6, %R8, %R12
add16s %R7, %R9, %R13
cmov16 (%P1) %R12, %R10
cmov16 (%P0) %R13, %R11
```

HyperOp Code (Double Conditional Store)

```
{
|A|    ld32 %R2.D, %A; // load 32b R2:R3
|B|    ld32 %R4.D, %B; // load 32b R4:R5
|DP1|  tcmp16s GT %AH, %BH, %P1; // test (R2 > R4) and set pred P1
|DP0|  tcmp16s GT %AL, %BL, %P0; // test (R3 > R5) and set pred P0
}
{
|A|    ld32 %R6.D, %A; // load 32b R6:R7
|B|    ld32 %R8.D, %B; // load 32b R8:R9
|DP1|  add16s %AH, %BH, %D1; // D1 = R6 + R8
|DP0|  add16s %AL, %BL, %D0; // D0 = R7 + R9
|D|    dst16 (%P1 %P0) %D1_D0, %R10.D; // if(P1) store D1 to 16b R10, if(P0)
                                        // store D0 to 16b R11
}
```

Notes:
conditional execution applied to slotD instruction
uses SIMD predicated execution mode
  if (% P1% P0) { ... }
  % P1 controls high word
  % P0 controls low word

Detect Non-Zero Elements of an Array, Save Values
C Code

```
int16 a[N], b[N];
int16 i, j;
j = 0;
for(i = 0; i < N; i++)
{
  if ( a[i] < > 0 )
    b[j++] = a[i];
}
```

ASM Code Using GPn

```
// Assume:
// %I1 used for i
// %I2 used for j
// %B1 points to a[ ]
// %B2 points to b[ ]
// %I0 used as a temp GR
gmovi $0, %I2 // I2 = 0
repeat $0, $N-1, $1, %I1, L_loop_start, L_loop_end
L_loop_start:
  mov16 0[%B1+%I1], %I0 // I0 = a[i]
  // +4 cycles stall on loading %I0 in EX and using in FD
  gtcmps NE %I0, $0, %GP0 // test (a[i] < > 0) and set pred GP0
  cmov16 (%GP0) 0[%B1+%I1], 0[%B2+%I2] // if(GP0) move a[i] to 16b b[j]
  gadd (%GP0) %I2, $1, %I2 // if(GP0) j++
```

-continued

L_loop_end:
Cycles: 2+N(1+4+3) = 2+8N

ASM Code Using Pn

```
gmovi $0, %I2              // I2 = 0
  repeat $0, $N-1, $1, %I1, L_loop_start, L_loop_end
  L_loop_start:
    tcmp16s NE 0[%B1+%I1], $0, %P0      // test (a[i] < > 0)
      and set pred P0
    cmov16 (%P0) 0[%B1+%I1], 0[%B2+%I2]  // if(P0) move a[i]
      to 16b b[j]
    // +3 cycles stall on setting %P0 in EX and using in FD
    gadd (%P0) %I2, $1, %I2   // if(P0) j++
L_loop_end:
Cycles: 2+N(2+3+1) = 2+6N
```

HyperOps Code Simple Using Pn (Conditional G Slot Execution)

```
// Assume:
// %B1 points to a[ ], i is in %I1
// %B2 points to b[ ], j is in %I2
gmovi $0, %I2 // I2 = 0
repeat $0, $N-1, $1, %I1, L_loop_start, L_loop_end
L_loop_start:
  {
    |A| ld16 0[%B1+%I1], %AL; // load 16b a[i]
    |DP0| mov16s %AL, %D0;
    |DP1| tcmp16 NE %AL, $0, %P0; // test (a[i] < > 0)
      and set
      pred P0
  }
  {
    |D| st16 (%P0) %D0, 0[%B2+%I2];  // if(P0) move a[i]
      to 16b b[j]
  }
  // +3 cycles stall on setting %P0 in EX and using in FD
  {
    |G| gadd (%P0) %I2, $1, %I2;  // if(P0) j++
  }
L_loop_end:
Cycles: 2+N(1+1+3+1) = 2+6N
```

HyperOps Code Pipelined, Using Pn (Conditional Store)

```
// Assume:
// %B1 points to a[ ], i is in %I1
// %B2 points to b[ ], j is in %I2
gdmovi $0, $1, %I2, %S2       // I2 = 0, S2 = 1
repeat $0, $N-1, $4 %I1, L_loop_start, L_loop_end
L_loop_start:
  { |A| ld16 0[%B1+%I1], %AL; |DP1| mov16 %AL, %ACC0; |DP0|
    tcmp16 NE %AL, $0, %P0; }
  { |A| ld16 1[%B1+%I1], %AL; |DP1| mov16 %AL, %ACC1; |DP0|
    tcmp16 NE %AL, $0, %P1; }
  { |A| ld16 2[%B1+%I1], %AL; |DP1| mov16 %AL, %ACC2; |DP0|
    tcmp16 NE %AL, $0, %P2; }
  { |A| ld16 3[%B1+%I1], %AL; |DP1| mov16 %AL, %ACC3; |DP0|
    tcmp16 NE %AL, $0, %P3; }
  // +1 cycles stall on setting %P0 in EX and using in FD
  { |A| incr (%P0) $(_i2Mask); |D| st16 (%P0) %ACC0,
    0[%B2+%I2]; }
  { |A| incr (%P1) $(_i2Mask); |D| st16 (%P1) %ACC1,
    0[%B2+%I2]; }
  { |A| incr (%P2) $(_i2Mask); |D| st16 (%P2) %ACC2,
    0[%B2+%I2]; }
  { |A| incr (%P3) $(_i2Mask); |D| st16 (%P3) %ACC3,
    0[%B2+%I2]; }
L_loop_end:
Cycles: 1+N/4(4+1+4) = 1+2.25N
```

HyperOps Code Using 2 PEs

```
// Use PE0 to perform the test on the input array a[ ]:
for(i=0; i<N; i++)
{
  if ( a[i] < > 0 )
    sendToPE1 ( a[i] );
}
// Use PE1 to perform save the sparse output array b[ ]:
idx = 0;
while(1)
{
  tmp = recvFromPE0( );
  b[idx++] = tmp;
}
```

PE0

```
// Assume:
// %B1 points to a[ ], i is in %I1
repeat $0, $N-1, $1 %I1, L_loop_start, L_loop_end
L_loop_start:
  tcmp16 NE 0[%B1+%I1], $0, %P0;
  cmov16 (%P0) 0[%B1+%I1], PE0_PE1_QPORT;
L_loop_end:
PE0 Cycles: 1+2N
```

PE1

```
// Assume:
// %B2 points to b[ ], j is in %I2
gdmovi $0, $1, %I2, %S2       // I2 = 0, S2 = 1
L_loop:
jmp L_loop;                   // loop forever on QPort
{
  |A| incr $(_i2Mask);        // I2+=S2; update avail for
    next instruction
  |B| ld16 PE0_PE1_QPORT, %BL;
  |DP0| mov16 %BL, %D0;
  |D| st16 %D0, 0[%B2+%I2];   // store uses current value
    of I2 (not
                              // updated)
}
```

Notes:
using 2 PEs avoids stall on setting % GP0 in EX and using in FD

Detect Non-Zero Elements of an Array, Save Indices
C Code

```
int16 a[N], b[N];
int16 i, j;
j = 0;
for(i=0; i<N; i++)
{
  if ( a[i] < > 0 ) { b[j++] = i; }
}
```

ASM Code Using GPn

```
// Assume:
// %B1 points to a[ ], i is in %I1
// %B2 points to b[ ], j is in %I2
gmov $0, %I2
repeat $0, $N-1, $1 %I1, L_loop_start, L_loop_end
L_loop_start:
  mov16 0[%B1+%I1], %I0  // load a[i] into temp I0
  // +4 cycles stall on loading %I0 in EX and using in FD
  gtemps NE %I0, $0, %GP0  // test (a[i] < > 0) and set pred GP0
  cmov16 (%GP0) %I1, 0[%B2+%I2]  // if(GP0) move i to 16b b[j]
```

```
  gadd (%GP0) %I2, $1, %I2 // if (GP0) incr j++
L_loop_end:
Cycles: 2+N(1+4+3) = 2+8N
```

ASM Code Using Pn

```
// Assume:
// %B1 points to a[ ], i is in %I1
// %B2 points to b[ ], j is in %I2
gmov16 $0, %I2
repeat $0, $N-1, $1 %I1, L_loop_start, L_loop_end
L_loop_start:
  tcmp16s NE 0[%B1+%I1], $0 , %P0      // test (a[i] < > 0) and set
                                        pred P0
  cmov16 (%P0) %I1, 0[%B2 + %I2]        // if(P0) move i to 16b
   b[j]
  // +3 cycles stall on setting %P0 in EX and using in FD
  gadd (%P0) %I2, $1, %I2              // if(P0) incr j++
L_loop_end:
Cycles: 2+N(2+3+1) = 2+6N
```

ASM Code Using Pipelined Pn

```
// Assume:
// %B1 points to a[ ], i is in %I1
// %B2 points to b[ ], j is in %I2
gmov16 $0, %I2
repeat $0, $N-1, $4 % I1, L_loop_start, L_loop_end
L_loop_start:
  tcmp16s NE 0[%B1+%I1], $0, %P0 // test (a[i+0] < > 0) and set
                                  pred P0
  tcmp16s NE 1[%B1+%I1], $0, %P1 // test (a[i+1] < > 0) and set
                                  pred P1
  tcmp16s NE 2[%B1+%I1], $0, %P2 // test (a[i+2] < > 0) and set
                                  pred P2
  tcmp16s NE 3[%B1+%I1], $0, %P3 // test (a[i+3] < > 0) and set
                                  pred P3
  add16s (%P0) %I1, $0, 0 [%B2+%I2] // if(P0) move i+0 to16b
   b[j]
  gadd (%P0) %I2, $1, % I2 // if(P0) incr j++
  add16s (%P1) %I1, $1, 0[%B2+%I2] // if(P1) move i+1 to 16b
   b[j]
  gadd (%P1) %I2, $1, % I2// if(P1) incr j++
  add16s (%P2) %I1, $2, 0 [%B2 + %I2] // if(P2) move i+2 to 16b
   b[j]
  gadd (%P2) %I2, $1, %I2 // if(P2) incr j++
  add16s (%P3) %I1, $3, 0[%B2 + %I2] // if(P3) move i+3 to 16b
   b[j]
  gadd (%P3) %I2, $1, % I2 // if(P3) incr j++
L_loop_end:
Cycles: 2+N/4(4+8) = 2+3N
```

HyperOps Code Simple, Using GPn (Conditional G Slot and Store)

```
// Assume:
// %B1 points to a[ ], i is in %I1
// %B2 points to b[ ], j is in %I2
gdmov $0, $1, %I2, %S2
repeat $0, $N-1, $1 %I1, L_loop_start, L_loop_end
L_loop_start:
  {
    |A| ld16 0[%B1+%I1], %AL; // load a[i] into AL
    |DP0| mov16 %AL, %D0; // move a[i] to D0
    |D| st16 %D0, %I0; // store D0=a[i] into temp I0
  }
  // +4 cycles stall on writing %I0 in EX and using in FD
  {
    |B| ld16 %I1, %BH; // load i into BH
    |DP0| mov16s %BH, %D0; // move i to D0
    |G| gtcmps NE %I0, $0, %GP0; // test (a[i] < > 0) and set
                                  pred GP0
```

```
  }
  {
    |A| incr (%GP0) $(_i2Mask); // if (GP0) incr j++
    |D| st16 (%GP0) %D0, 0[%B2+%I2];// if(GP0) move i to
     16b b[j]
  }
L_loop_end:
Cycles: 2+N(1+4+2) = 2+7N
```

HyperOps Code Simple Using Pn

```
// Assume:
// %B1 points to a [ ], i is in %I1
// %B2 points to b [ ], j is in %I2
gdmovi $0, $1, %I2, %S2
repeat $0, $N-1, $1 % I1, L_loop_start, L_loop_end
L_loop_start:
{
  |A| ld16 0[%B1+%I1], %AL; // load api[ into AL
  |B| ld16 %I1, %BL; // load i into BL
  |DP1| tcmp16s NE %AL, $0, %P0; // test (a [i] < > 0) and set
                                  pred P0
  |DP0| mov %BL, %D0; // move i to D0, ready for store
}
// +4 cycles stall on writing %P0 in EX and using in FD
{
  |A| incr (%P0) $ (_i2Mask); // if(P0) incr j++
  |D| st16 (%P0) %D0, 0[%B2+%I2]:// if(P0) move to i to 16b b[j]
}
L_loop_end:
Cycles: 2+N(1+4+1) = 2+6N
```

HyperOps Code Pipelines Using GPn

```
// Assume:
// %B1 points to a [ ], i is in %I1
// %B2 points to b [ ], j is in %I2
gdmovi $0, $1, %I2, %S2
repeat $0, $N-1, $5 %I1, L_loop_start, L_loop_end
L loop start:
  // load next 5 values from a[ ] into temp GRs
  { |A| ld16 0[%B1+%I1], %AL; |DP0| mov16s %AL, %D0; |D| st16
    %D0, %T4; }
  { |A| ld16 1[%B1+%I1], %AL; |DP0| mov16 %AL, %D0; |D| st16
    %D0, %T5; }
  { |A| ld16 2 [%B1+%I1], %AL; |DP0| mov16 %AL, %D0; |D| st16
    %D0, %T6; }
  { |A| ld16 3 [%B1+%I1], %AL; |DP0| mov16 %AL, %D0; |D| st16
    %D0, %T7; }
  { |A| ld16 4 [%B1+%I1], %AL; |DP0| mov16 %AL, %D0; |D| st16
    %D0, %I0; }
  // if ( a[i] < > 0 ) { b[j++] = i; }// test a[i+0]
  { |A| ld16 %I1, %AH; |G| gtcmpi16 NE %T4, $0, %GP0; |DP0|
    add16s %AH, %D0; }
  { |A| incr (%GP0) $(_i2Mask); |D| st16 (%GP0) %D0,
    0[%B2+%I2]; }
  // if ( a[i+1] < > 0 ) { b [ j++] = i+1; }// test a[i+1]
  { |G| gtcmpi16 NE %T5, $0, %GP0; |DP0| add16s %AH, $1, %D0;
    }
  { |A| incr (%GP0) $(_i2Mask); |D| st16 (%GP0) %D0,
    0[%B2+%I2]; }
  // if ( a[i+2] < > 0 ) { b[j++] = i+2; } // test a[i+2]
  { |G| gtcmpi16 NE %T6, $0, %GPO; |DP0| add16s %AH, $2, %D0;
    }
  { |A| incr (%GP0) $(_i2Mask); |D| st16 (%GP0) %D0,
    0[%B2+%I2]; }
  // if ( a[i+3] < > 0 ) { b[j++] = i+3; } // test a[i+3]
  { |G| gtcmpi16 NE %T7, $0, %GPO; |DP0| add16s %AH, $3, %D0;
    }
  { |A| incr (%GP0) $(_i2Mask); |D| st16 (%GP0) %D0,
    0[%B2+%I2]; }
  // if ( a[i+4] < > 0 ) { b[j++] = i+4; } // test a[i+4]
  { |G| gtcmpi16 NE %I0, $0, %GPO; |DP0| add16s %AH, $4, %D0;
    }
  { |A| incr (%GP0) $(_i2Mask); |D| st16 (%GP0) %D0,
```

```
    0[%B2+%I2]; }
L_loop_end:
Cycles: 2+N/5(5+5(2)) = 2+3N
```

Notes
Can hide all stalls by loading into 5 GRs
HyperOps Code Pipelined Using Pn

```
// Assume:
// %B1 points to a[ ], i is in %I1
// %B2 points to b[ ], j is in %I2
gdmovi $0, $1, %I2, %S2
repeat $0, $N-1, $4 %I1, L_loop start, L_loop_end
L_loop start:
    // test next 5 values of a[ ] into P0-3
    { |A| ld32 0[%B1+%I1], %A;
      |C| ld16 %I1, %CLL; // CLL = I1
      |DP1| tcmp16s NE %AH, $0, %P0;
      |DP0| tcmp16s NE %AL, $0, %P1;
    }
    { |B| ld32 2[%B1+%I1], %B;
      |DP1| tcmp16s NE %BH, $0, %P2;
      |DP0| tcmp16s NE %BL, $0, %P3;
    }
    // +3 cycles stall on setting %P0 in EX and using in FD
    // if ( a[i] < > 0 ) {b[j++] = i;} // using P0
    { |A| incr (%P0) $ (_i2Mask);
      |DP0| add16s %CLL, $0, %D0;
      |D| st16 (%P0) %D0, 0[%B2+%I2];
    }
    // if ( a[i+1] < > 0 ) { b[j++] = i+1; } // using P1
    { |A| incr (%P1) $(_i2Mask);
      |DP0| add16s %CLL, $1, %D0;
      |D| st16 (%P1) %D0, 0[%B2+%I2];
    }
    // if ( a[i+2] < > 0 ) { b[j++] = i+2; } // using P2
    { |A| incr (%P2) $(_i2Mask);
      |DP0| add16s %CLL, $2, %D0;
      |D| st16 (%P2) %D0, 0[%B2+%I2];
    }
    // if ( a[i+3] < > 0 ) { b[j++] = i+3; } // using P3
    { |A| incr (%P3) $(_i2Mask) ;
      |DP0| add16s %CLL, $3, %D0;
      |D| st16 (%P3) %D0, 0[%B2+%I2];
    }
L_loop_end:
Cycles: 2+N/4(2+3+4) = 2+2.25N
```

Notes
Cannot hide all stalls with 4 Pn
HyperOps Code Using Tagged Data

```
// Assume:
// %B1 points to a [ ] , i is in %I1
// %B2 points to b [ ] , j is in %I2
gdmovi $0, $1, %I2, %S2
repeat $0, $N-1, $4 %I1, L_loop_start, L_loop_end
L_loop start:
    // test next 4 values of a[ ] into P0-3
    {
      |A| ld32 0[%B1+%I1], %A; // load AH = a[i+0], AL = a[i+1]
      |C| ld16 $a, %CLL; // CLL = &a[0]
      |DP1| tcmp16 NE %AH, $0, %P0; // test (a[i+0] < > 0) and set pred P0
      |DP0| tcmp16 NE %AL, $0, %P1; // test (a[i+1] < > 0) and set pred P1
    }
    {
      |B| ld32 2[%B1+%I1], %B; // load BH = a[i+2], BL = a[i+3]
      |DP1| tcmp16 NE %BH, $0, %P2; // test (a[i+2] < > 0) and set pred P2
      |DP0| tcmp16 NE %BL, $0, %P3; // test (a[i+3] < > 0) and set pred P3
    }
    // +3 cycles stall on setting %P0 in EX and using in FD
       (INCR inst)
    // if ( a[i] < > 0 ) { b[j++] = i; }
    {
      |A| incr (%P0) $(_i2Mask) ; // if(P0) incr j++
      |B| ld16t 0[%B1+%I1], %B; // load tagged data B = { &a[i] :a[i] }
      |DP0| sub16s %BH, %CLL, %D0; // D0 = &a[i]-&a[0] = i
      |D| st16 (%P0) %D0, 0[%B2 + %I2];// if(P0) store i to 16b b [ j ]
    }
    // if ( a[i+1] < > 0 ) { b[j++] = i+1; }
    {
      |A| incr (%P1) $(_i2Mask) ; // if (P1) incr j++
      |B| ld16t 1[%B1+%I1], %B; // load tagged data B = {&a[i+1]:a[i+1]}
      |DP0| sub16s %BH, %CLL, %D0; // D0 = &a[i+1]-&a[0] = i+1
      |D| st16 (%P1) %D0, 0[%B2+%I2]; // if(P1) store i+1 to 16b b [ j ]
    }
    // if ( a[i+2] < > 0 ) { b[j++] = i+2; }
    {
      |A| incr (%P2) $(_i2Mask); // if(P2) incr j++
      |B| ld16t 2 [%B1+%I1] , %B; // load tagged data B = {&a [ i+2] :a[i+2] }
      |DP0| sub16s %BH, %CLL, %D0; // D0 = &a[i+2]-&a [ 0] = i+2
      |D| st16 (%P2) %D0, 0 [%B2 + %I2];// if(P2) store i+2 to 16b b [ j ]
    }
    // if ( a[i+3] < > 0 ) { b[j++] = i+3; }
    {
      |A| incr (%P3) $(_i2Mask); // if(P3) incr j++
      |B| ld16t 3[%B1+%I1], %B; // load tagged data B = {&a [i+3]:a[i+3] }
      |DP0| sub16s %BH, %CLL, %D0; // D0 = &a[i+3]-&a [ 0] = i+3
      |D| st16 (%P3) %D0, 0[%B2+%I2];// if(P3) store i+3 to 16b b[j]
    }
L_loop_end:
Cycles: 2+N/4(2+3+4) = 2+2.25N
```

Notes:

tagged load LD16T loads 16b data (to lower 16b) and its address (to upper 16b) as packed data data index is data address (or tag)—array start Access an Array Using Indirection C Code

```
int16 a[N], b[N], c[N];
int16 i, j;
for (i=0; i<N; i++)
{
    j = b[i] ;
    a[i] = c[j];
}
```

ASM Code

```
// Assume %B1 points to a [ ], i is in %I1
// Assume %B2 points to b [ ], i is in %I1
// Assume %B4 points to c [ ], j is in %I2
repeat $0, $N-1, $1 %I1, L_loop_ start, L_loop_end
L_loop_start:
    mov16 0[%B2+%I1], %I2
    // + 4 cycles stall on setting %I2 in EX and using in FD
    mov16 0[%B4+%I2], 0[%B1+%I1]
L_loop_end:
Cycles: 1+N(1+4+1) = 1+6N
```

HyperOps Code Simple

```
// Assume %B1 points to a [ ], i is in %I1
// Assume %B2 points to b [ ], i is in %I1
// Assume %B4 points to c [ ], j is in %I2
repeat $0, $N-1, $1 %I1, L_loop_start, L_loop_end
L_loop_start:
    { |A| ld16 0[%B2+%I1], %AL; |DP0| mov %AL, %D0; |D| st16
        %D0, %12 }
    // +4 cycles stall on setting %I2 in EX and using in FD
    { |B| ld16 0[%B4+%I2], %BL; |DP0| mov %BL, %D0; |D| st16
        %D0, 0[%Bl+%I1] };
L_loop_end:
Cycles: 1+N(1+4+1) = 1+6N
```

HyperOps Code Pipelined

```
// Assume %B1 points to a [ ], i is in %I1
// Assume %B2 points to b [ ], i is in %I1
// Assume %B4 points to c [ ], j is in %I2-%I7
// j0 = b[ 0 ] ; j1 = b [1] ;
{|A| ld32 0[%B2], %A; |DP0| mov32 %A, %D0; |D| st32 %D0, %1213;
}
// j2 = b[2] ; j3 = b[3];
{|A| ld32 2[%B2], %A; |DP0| mov32 %A, %D0; |D| st32 %D0, %1415;
}
// j4 = b [4]; j5 = b[5];
{|A| ld32 4[%B2], %A; |DP0| mov32 %A, %D0; |D| st32 %D0, %1617;
}
// +1 cycles stall on setting %12,%13 in EX and using in FD
repeat $0, $N-1, $6 %I1, loop_start, L_loop_end
L_loop_start:
// a[i+0] = c[j0]; a[i+1] = c[j1]; j0 = b[i+6]; j1 = b[i+7]
    { |A| ld16 0[%B4+%I2], %AL; |B| ld16 0[%B4+%I3], %BL
      |DP1| mov16 %AL, %D1; |DP0| mov16 %BL, %D0; |D| dst16 %D1 D0,
0 [%B1+%I1]; }
    { |A| ld32 6[%B2+%I1], %A; |DP0| mov32 %A, %D0; |D| st32 %D0,
%I2I3; }
// a[i+2] = c[j2]; a[i+3] = c[j3]; j2 = b[i+8]; j3 = b [i+9];
    { |A| ld16 0[%B4+%I4], %AL; |B| ld16 0[%B4+%I5], %BL;
      |DP1| mov16 %AL, %D1; |DP0| mov16 %BL, %D0; |D| dst16 %D1_D0,
2[%B1+%I1]; }
    { |A| ld32 8[%B2+%I1], %A; |DP0| mov32 %A, %D0; |D| st32 %D0,
%I4I5; }
// a[i + 4] = c[j4]; a[i+5] = c[j5]; j4 = b[i+10]; j5 = b[i+11];
    { |A| ld16 0[%B4+%I6], %AL; |B| ld16 0[%B4+%I7], %BL;
      |DPI| mov16 %AL, %D1; |DP0| mov16 %BL, %D0; |D| dst16 %D1_D0,
4[%B1+%I1]; }
    { |A| ld32 10[%B2+%I1], %A; |DP0| mov32 %A, %D0; st32 %ACC0
%I6I7; }
// ignore the final values loaded into I2-I7
L_loop_end:
Cycles: 3+1+1+N/6(6) = 5+N
```

Notes:
indexes j loaded from b[i] in pairs in 1 cycle
two c[j] loaded and stored to a[i] as a pair in 1 cycle
using 6 index registers avoids pipeline bubble of setting index in EX and using it in FD
Conditional Accumulation Using Dual-DP
The following is an example of where we can use conditional HyperOps with 2 predicates.
C Code

```
int16 a[N], b[N], c[N] ;
int16 i;
int32 sum = 0;
for (int i = 0; i < N; i++) {
    if (a[i] > b[i] )
        sum += a[i] * c[i];
}
```

ASM Code

This example uses vector intrinsics (pseudo ASM instructions) to access dual-DP.

```
repeat $0, $N-1, $2, IDX_i, L_loop_start, L_loop_end
movx16s $0, %ACC2
movx16s $0, %ACC0
L_loop_start:
    vtcmp16s GT 0[BP_a+IDX_i] , 0[BP_b+IDX_i] , %P1P0;
    cmov16 (%P1) 0[BP_a+IDX_i], $0, %R0
    cmov16 (%P0) 1[BP_a+IDX_i], $0, %R1
    vmulaa16s %R0.D, 0[BP_c+IDX_i], %ACC2_ACC0
L_loop_end:
accadd %ACC0, $0, %ACC2
Cycles: 3+N/2(4)+1 = 4+2N
```

HyperOps Code (Conditional DP Slot Execution—Both Slots)

```
#define BP_a %B1
#define BP_b %B2
#define BP_c %B3
#define IDX_i %I1
repeat $0, $N-1, $2, IDX i, L_loop_start, L_loop_end
{ |DPI| movx16s $0, %ACC2; |DP0| movx16s $0, %ACC0; }
L_loop_start:
    { |A| ld32 0[BP_a+IDX_i], %A; |B| ld32 0[BP_b+IDX_i], %B;
      |DP1| tcmp16s GT %AH, %BH, %P1; |DP0| tcmp16s GT %AL,
%BL,
        %P0; }
    { |C| ld32 0[BP_c+IDX_i], %B;
      |DPI| mulaa16s (%P1) %AH, %BH, %ACC2; |DP0|
mulaa16s (%P0)
        %AL, %BL, %ACC0; }
L_loop_end:
accadd %ACC0, $0, %ACC2
Cycles: 1+N/2(2)+1 = 2+N
```

Notes:
process iterations i and i+1 in parallel using DP1 and DP0
split sum into % ACC0 and % ACC2, then combine at the end
use predicate flags % P1 and % P0 to control the accumulations into % ACC2 and % ACC0 independently
Conditional Accumulation Using Dual-DP, Each Using Dual-MUL
The following is an example of where we can use conditional HyperOps with 4 predicates.

C Code
```
int16 a[N], b[N], c[N];
int16 i;
int32 sum = 0;
for (int i = 0; i < N; i++) {
    if (a[i] > b[i] )
        sum += a[i] * c[i];
}
```

HyperOps Code (Quad Conditional Using Both DPs)

```
#define BP_a %B1
#define BP_b %B2
#define BP_c %B3
repeat $0, $N-1, $4, IDX_i, L_loop_start, L_loop_end
{ |DP1| movx16s $0, %ACC2; |DP0| movx16s $0, %ACC0; }
L_loop_start:
    { |A| ld64 0[BP_a+IDX_i], %AB; |C| ld64 0[BP_b+IDX_i], %C;
      |DP1| dtcmp16s GT %A, ICH, %P3P2;
      |DP0| dtcmp16s GT %B, %CL, %P1P0; }
    { |C| ld64 0[BP_c+IDX_i], %C;
      |DP1| dmulaa16s (%P3P2) %A, %CH, %ACC2;
      |DP0| dmulaa16s (%P1PO) %B, %CL, %ACC0; }
L_loop_end:
    accadd %ACC0, $0, %ACC2
Cycles: 2+N/4(2)+1 = 3+0.5N
```

Notes:
process iterations i . . . i+3 in parallel:
    i and i+1 in DP1
    i+2 and i+3 in DP0
DP0 performs double operations, DP1 performs double operations
split sum into % ACC0 and % ACC2, then combine at the end
use predicate flags P0-P3 to control the accumulations of products into % ACC0 and % ACC2 independently
b[ ] and c[ ] must be different DMRs to a[ ] for the 64b accesses to work Conditional Store Using Dual-DP The following C code is an example of where we can use conditional HyperOps to perform conditional store.

C Code

```
int16 a[N], b[N], c[N], d[N];
int16 i;
for (int i = 0; i < N; i++) {
    if (a[i] > b[i])
        d[i] = a[i] * c[i];
}
```

ASM Code

This example uses vector intrinsics (pseudo ASM instructions) to access dual-DP.

```
#define BP_a %B1
#define BP_b %B2
#define BP_c %B3
#define BP_d %B4
#define IDX_i %I1
repeat $0, $N-1, $2, IDX_i, L_loop_start, L_loop_end
L_loop_start:
    vtcmp16s GT [BP_a+IDX_i], [BP_b+IDX_i], %P1P0
    vmul16s (%P1P0) [BP_a+IDX_i], [BP_c+IDX_i], [BP_d+IDX_i]
L_loop_end:
```

HyperOps Code (Dual Conditional Store)

```
define    BP_a    %B1
#define   BP_b    %B2
#define   BP_c    %B3
#define   BP_d    %B4
#define   IDX_i   %I1
repeat $0, $N-1, $2, IDX_i, L_loop_start, L_loop_end
L_loop_start:
    { |A| ld32 0 [BP_a+IDX_i], %A; |B| ld32 0 [BP_b+IDX_i], %B;
      |DP1| tcmp16s GT %AH, %BH, %P1; |DP0| tcmp16s GT %AL, %BL, %P0; }
    { |C| ld32 0 [BP_c+IDX_i], %CL;
      |DP1| mul16s %AH, %CLH, %D1; |DP0| mul16s %AL, %CLL, %D0;
      |D| dst16 (%P1P0) %D1_D0, 0 [BP_d+IDX_i]; }
L_loop_end:
```

Notes:

process iterations i and i+1 in parallel using DP1 and DP0 use predicate flags P1 and P0 to control the 16b:16b stores independently (SIMD mode)

Conditional if-Else-if Example Using Conditional Jump

C Code

```
absq = abs (q);
if (absq < qmin) {
    qmin2 = qmin;
    qmin = absq;
    imin = i;
}
else if (absq < qmin2) {
    qmin2 = absq;
}
```

ASM Code

```
// assume imin and qmin stored as packed data imin_qmin (even address)
abs16s q, absq                    // absq = abs(q)
tcmp16 LT absq, qmin, %P1         // P1 = (absq < qmin)
jmp (!%P1) L_else PNT             // if(!P1) skip qmin update
tcmp16 LT absq, qmin2, %P0        // P0 = (absq < qmin2) -- delay slot
L_if:                             // update qmin and qmin2:
mov16 qmin, qmin2                 // qmin2 = qmin
jmp L_end
dmov16 i, absq, imin_qmin         // qmin = absq, imin = i - delay slot
L_else:
jmp (!%P0) L_end PNT DLY
nop                               // delay slot
mov16 absq, qmin2                 // update only qmin2
L_end:
```

ASM Code with DLY-Optimization

```
abs16s q, absq
tcmp16 LT absq, qmin, %P1
jmp (!%P1) L_else PNT
tcmp16 LT absq, qmin2, %P0        // executed in delay slot
L_if:
mov16 qmin, qmin2
jmp L_end
dmov16 i, absq, imin_qmin         // executed in delay slot
L_else:
jmp (!%P0) L_end PNT DLY
mov16 absq, qmin2                 // executed after JMP, not in delay slot
L_end:
```

Conditional if-Else-if Example Using Conditional Move

C Code

```
absq = abs (q);
if (absq < qmin) {
    qmin2 = qmin;
    qmin = absq;
    imin = i;
}
else if (absq < qmin2) {
    qmin2 = absq;
}
```

ASM Code

```
// assume imin and qmin stored as packed data imin_qmin (even address)
abs16s q, absq                          // absq = abs(q)
tcmp16s LT absq, qmin, %P1              // P1 = (absq < qmin)
tcmp16s LT absq, qmin2, %P0             // P0 = (absq < qmin2)
cmov16 (%P1) qmin, qmin2                // if (P1) qmin2 = qmin
cmov16 (%P1) absq, qmin                 // if (P1) qmin = absq
cmov16 (%P1) i, imin                    // if (P1) imin = i
cmov16 (!%P1 & %P0) absq, qmin2         // else if (P0) qmin2 = absq
```
Cycles: 7

HyperOps Code

```
{ |A| ld16 q, AL;
  |B| ld16 i, %BL;
  |DP1| mov16 %BL, %ACC3; // ACC3 = i
  |DP0| abs16s %AL, %ACC1; // ACC1L = absq
  |D| dst16 %ACC3_ACC1, %ACC3; } // ACC3H = i, ACC3L = absq
{ |A| ld32 imin_qmin, %A;// AH = imin, AL = qmin
  |B| ld16 qmin2, %BL; // BL = qmin2
  |DP1| tcmp16 LT %ACC3L, %AL, %P1; // P1 = (absq < qmin)
  |DP0| tcmp16 LT %ACC1L, %BL, %P0; } // P0 = (absq < qmin2)
{ |DP1| if(%P1) cmov32 %ACC3, %A, %ACC2 ; // if (P1) {ACC2H = i, ACC2L = absq}
        // else {ACC2H = imin, ACC2L = qmin}
  |DP0| if(%P1) cmov16 %AL, %BL, %ACC0; // ACC0 = (P1) ? qmin2 : qmin
  |D| st32 %ACC2, imin_qmin; } // update imin:qmin = ACC2H:ACC2L
{ |DP0| if(!%P1 & %P0) cmov16 %ACC3L, %ACC0L, %ACC0; // else ACC0L = (P0) ? absq : qmin
  |D| st16 %ACC0, qmin2; } // update qmin2 = ACC0L
```
Cycles: 4

Notes:

use % P1 and % P0 to hold boolean results of IF and ELSE IF tests assume imin and qmin stored as packed 16:16 in memory use % P1 and % P0 with CSEL to conditionally update state variables, in pairs where possible Combining Tests Using Predicate Flags C Code

```
int16 a, b, c, d, e;
void test ( ) {
    a = (b < c) && (d < e);
}
```

ASM Code

```
tcmp16s LT b, c %P0              // P0 = (b < c)
tcmp16s LT d, e, %P1             // P1 = (d < e)
cmov16 (%P0 & %P1) $1, $0, a     // a = (P0 & P1) 1 : 0
```

Notes:

The compiler will replace && with & operator:

$$a=(b<c)\&(d<e)$$

Combining Tests Using Register File
C Code

```
int16 a, b, c, d, e;
void test( ) {
    a = (b < c) && (d < e);
}
```

ASM Code

```
tcmp16s LT b, c, %R0        // R0 = (b < c)
tcmp16s LT d, e, %R1        // R1 = (d < e)
and16 %R0, %R1, a           // a = R0 & R1
```

Notes:
The compiler will replace && with & operator:

$a=(b<c)\&(d<e)$

Conditional Jump to Subroutine
C Code

```
int a, b, c, d, e, f;
if ( (a < b) & (c < e) | (d > f) )
    foo( );
```

ASM Code

```
tcmp16s LT a, b, %R1              // R1 = (a < b)
tcmp16s LT c, e, %R2              // R2 = (c < e)
tand16 NZ %R1, %R2, %P0           // P0 = (a < b) & (c < e)
tcmp16s GT d, f, %P1              // P1 = (d > f)
jsr (% (%P0 | %P1) foo            // if (P0 | P1) foo ( )
```

Notes:
Use TAND16 rather than AND16
   Note Pn can't be the dstD for an ALU operation, other than TEST
Assignment of Logical/Test Operation Results
C Code

```
int16 a, b, c, d, e, f, result;
result = ( (a < b) & (c < e) | (d > f) );
```

ASM Code

```
tcmp16s LT a, b, %R1           // R1 = (a < b)
tcmp16s LT c, e, %R2           // R2 = (c < e)
and16 %R1, %R2, %R3            // P3 = (a < b) & (c < e)
tcmp16s GT d, f, %R4           // R4 = (d > f)
or16 %R3, %R4, result          // result = (R3 | R4)
```

Any of the various embodiments described herein may be realized in any of various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

An apparatus, comprising: a plurality of processors; and a plurality of data memory routers coupled to the plurality of processors in an interspersed arrangement, wherein a particular data memory router is configured to relay received messages to at least one other data memory router of the plurality of data memory routers; wherein a particular processor of the plurality of processors is configured to set at least predicate flag of a plurality of predicate flags; and conditionally execute an instruction using the plurality of predicate flags.

The aforementioned apparatus, wherein the plurality of predicate flags includes at least a first set of predicate flags associated with a datapath included in the particular processor, and a second set of predicate flags associated with an address generator unit included in the particular processor.

The aforementioned apparatus, wherein to set the at least one predicate flag of the plurality of predicate flags, the particular processor is further configured to, in response to execution of a test instruction, compare a first value and a second value to generate a result, and set the at least one predicate flag based on the result.

The aforementioned apparatus, wherein to compare the first value and the second value, the particular processor is further configured to perform a logical operation using the first value and the second value to generate the result.

The aforementioned apparatus, wherein to set the at least one predicate flag of the plurality of predicate flags, the particular processor is further configured to set the at least one predicate flag based on, at least in part, information indicative of timing operation of a datapath included in the particular processor.

The aforementioned apparatus, wherein to set the at least one predicate flag of the plurality of predicate flags, the particular processor is further configured to set the at least one predicate flag based on, at least in part, information indicative of timing operation of an address generator unit included in the particular processor.

The aforementioned apparatus, wherein to conditionally execute the instruction, the particular processor is further configured to conditionally execute one or datapath slots included in a datapath included in the particular processor using the plurality of predicate flags.

A method, comprising: setting, by a particular processor of a plurality of processors, at least one predicate flag of a plurality of predicate flags; wherein the plurality of processors is coupled to a plurality of data memory routers in an interspersed arrangement; conditionally executing, by the particular processor of the plurality of processors, an instruction using the plurality of predicate flags.

The aforementioned method, wherein the plurality of predicate flags include at least a first set of predicate flags associated with a datapath included in the particular processor, and a second set of predicate flags associated with an address generator unit included in the particular processor.

The aforementioned method, wherein setting the at least one predicate flag of the plurality of predicate flags includes comparing, in response to executing a test instruction by the particular processor, a first value and a second value to generate a result, and setting the at least one predicate flag based on the result.

The aforementioned method, wherein comparing the first value and the second value includes performing a logical operation using the first value and the second value to generate the result.

The aforementioned method, wherein setting the at least one predicate flag of the plurality of predicate flags includes setting, by the particular processor, the at least one predicate flag based on, at least in part, information indicative of timing operation of a datapath included in the particular processor.

The aforementioned method, wherein setting the at least one predicate flag of the plurality of predicate flags includes setting, by the particular processor, the at least one predicate flag based on, at least in part, information indicative of timing operation of an address generator unit included in the particular processor.

The aforementioned method, wherein conditionally executing, by the particular processor, the instruction includes conditionally executing one or datapath slots included in a datapath included in the particular processor using the plurality of predicate flags.

An apparatus, comprising: a plurality of processors; and a plurality of data memory routers coupled to the plurality of processors in an interspersed arrangement, wherein a particular data memory router is configured to relay received messages to at least one other data memory router of the plurality of data memory routers; wherein a particular processor of the plurality of processors is configured to: selectively activate a subset of a plurality of arithmetic logic circuits included in a particular data path of a plurality of data paths included in the particular processor based on a received instruction; and execute the received instruction using the subset of the plurality of arithmetic logic circuits.

The aforementioned apparatus, wherein to selectively activate the subset of the plurality of arithmetic logic circuits, the particular processor is further configured to decode the instruction to generate a decoded instruction, and to selectively activate the subset of the plurality of arithmetic logic circuits using the decoded instruction.

The aforementioned apparatus, wherein the particular processor of the plurality of processors is further configured to route data between individual arithmetic logic circuits included in the subset of the plurality of arithmetic logic circuits based on the instruction.

The aforementioned apparatus, wherein to route the data between the individual arithmetic logic circuit included in the subset of the plurality of arithmetic logic circuit the particular processor is further configured to selectively change a state of at least one multiplex circuit of a plurality of multiplex circuits included in the particular data path.

The aforementioned apparatus, wherein a particular arithmetic logic circuit of the plurality of logic circuits includes at least an adder circuit.

The aforementioned apparatus, wherein the particular arithmetic logic circuit of the plurality of logic circuits includes a lookup table configured to store an offset used in executing the instruction.

The aforementioned apparatus, wherein the instruction specifies a log probability operation.

A method, comprising: selectively activating a subset of a plurality of arithmetic logic circuits included in a particular data path of a plurality of data paths included in a particular processor of a plurality of processors; wherein the plurality of processors are coupled to a plurality of data memory routers in an interspersed arrangement; and executing, by the particular processor of the plurality of processor, the instruction using the subset of the plurality of arithmetic logic circuit.

The aforementioned method, wherein a selectively activating the subset of the plurality of arithmetic logic circuits includes decoding the instruction to generate a decoded instruction, and selectively activating the subset of the plurality of arithmetic logic circuits using the decoded instruction.

The aforementioned method, further comprising routing data between individual arithmetic logic circuits included in the subset of the plurality of arithmetic logic circuits based on the instruction.

The aforementioned method, wherein routing the data between the individual arithmetic logic circuit included in the subset of the plurality of arithmetic logic circuit the particular processor includes to selectively changing a state of at least one multiplex circuit of a plurality of multiplex circuits included in the particular data path.

The aforementioned method, wherein a particular arithmetic logic circuit of the plurality of logic circuits includes at least an adder circuit.

The aforementioned method, wherein the particular arithmetic logic circuit of the plurality of logic circuits includes a lookup table, and further comprising storing an offset used in executing the instruction in the lookup table.

The aforementioned method, wherein the instruction specifies a log probability operation.

Although the above embodiments have been described in connection with the preferred embodiment, it is not intended to be limited to the specific form set forth herein, but on the contrary, it is intended to cover such alternatives, modifications, and equivalents, as can be reasonably included within the spirit and scope of the embodiments of the invention as defined by the appended claims.

What is claimed is:
1. An apparatus, comprising:
a plurality of processors;
a plurality of data memory routers coupled to the plurality of processors in an interspersed arrangement, wherein a particular data memory router is configured to relay received messages to at least one other data memory router of the plurality of data memory routers; and
wherein a particular processor of the plurality of processors is configured to:

set a particular predicate flag of a plurality of predicate flags that includes a first set of predicate flags associated with a datapath included in the particular processor, wherein the particular predicate flag is set based at least in part on timing information associated with the datapath; and conditionally execute an instruction using the plurality of predicate flags.

2. The apparatus of claim 1, wherein the particular processor includes an address generator unit, and wherein the plurality of predicate flags includes a second set of predicate flags associated with the address generator unit.

3. The apparatus of claim 1, wherein the particular processor is further configured to:

in response to an execution of a test instruction, compare a first value and a second value to generate a result; and set, based on the result, the particular predicate flag.

4. The apparatus of claim 3, wherein to compare the first value and the second value, the particular processor is further configured to perform a logical operation using the first value and the second value to generate the result.

5. The apparatus of claim 1, wherein the datapath includes a plurality of slots, wherein the instruction is included in a particular slot of the plurality of slots, and wherein conditionally executing the instruction includes selecting, based on the particular predicate flag, the particular slot.

6. A method, comprising:

setting, by a particular processor of a plurality of processors, a particular predicate flag of a plurality of predicate flags that includes a first set of predicate flags associated with a datapath included in the particular processor, wherein the particular predicate flag is set based at least in part on timing information associated with the datapath, and wherein the plurality of processors is coupled to a plurality of data memory routers in an interspersed arrangement; and conditionally executing, by the particular processor, an instruction using the plurality of predicate flags.

7. The method of claim 6, wherein the particular processor includes an address generator unit, and wherein the plurality of predicate flags includes a second set of predicate flags associated with the address generator unit.

8. The method of claim 6, further comprising:

in response to executing a test instruction, comparing, by the particular processor, a first value and a second value to generate a result; and setting, by the particular processor and based on the result, the particular predicate flag.

9. The method of claim 8, wherein comparing the first value and the second value includes performing a logical operation using the first value and the second value to generate the result.

10. The method of claim 6, wherein the datapath includes a plurality of slots, wherein the instruction is included in a particular slot of the plurality of slots, and wherein conditionally executing the instruction includes selecting, based on the particular predicate flag, the particular slot.

11. A computer system, comprising:

a user interface;

a plurality of processors; and a plurality of data memory routers coupled to the plurality of processors in an interspersed arrangement, wherein a particular data memory router is configured to relay received messages to at least one other data memory router of the plurality of data memory routers;

wherein a particular processor of the plurality of processors is configured to:

set a particular predicate flag of a plurality of predicate flags that includes a first set of predicate flags associated with a datapath included in the particular processor, wherein the particular predicate flag is set based at least in part on timing information associated with the datapath; and conditionally execute an instruction using the plurality of predicate flags.

12. The computer system of claim 11, wherein the particular processor includes an address generator unit, and wherein the plurality of predicate flags includes a second set of predicate flags associated with the address generator unit.

13. The computer system of claim 12, wherein the particular processor is further configured to set, based on timing information associated with the address generator unit, a different predicate flag included in the second set of predicate flags.

14. The computer system of claim 11, wherein the particular processor is further configured to:

in response to an execution of a test instruction, compare a first value and a second value to generate a result; and set, based on the result, the particular predicate flag.

15. The computer system of claim 14, wherein to compare the first value and the second value, the particular processor is further configured to perform a logical operation using the first value and the second value to generate the result.

16. The computer system of claim 11, wherein the datapath includes a plurality of slots, wherein the instruction is included in a particular slot of the plurality of slots, and wherein conditionally executing the instruction includes selecting, based on the particular predicate flag, the particular slot.

* * * * *